US011982954B2

(12) United States Patent
Suzuki et al.

(10) Patent No.: US 11,982,954 B2
(45) Date of Patent: May 14, 2024

(54) DEVELOPING DEVICE

(71) Applicant: CANON KABUSHIKI KAISHA, Tokyo (JP)

(72) Inventors: Takahiro Suzuki, Saitama (JP); Tomoyuki Sakamaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 35 days.

(21) Appl. No.: 17/826,401

(22) Filed: May 27, 2022

(65) Prior Publication Data

US 2022/0404740 A1 Dec. 22, 2022

(30) Foreign Application Priority Data

Jun. 21, 2021 (JP) ................................ 2021-102397

(51) Int. Cl.
*G03G 15/09* (2006.01)

(52) U.S. Cl.
CPC ................................ *G03G 15/0921* (2013.01)

(58) Field of Classification Search
CPC ........... G03G 15/0921; G03G 15/0812; G03G 15/0928
See application file for complete search history.

(56) References Cited

U.S. PATENT DOCUMENTS

2010/0202805 A1* 8/2010 Miyoshi ............. G03G 15/0921 399/277
2014/0286681 A1* 9/2014 Inaba ................. G03G 15/0921 399/277
2017/0235248 A1 8/2017 Shima et al.
2022/0066356 A1* 3/2022 Okuyama .......... G03G 15/0928
2022/0404741 A1* 12/2022 Sakamaki .......... G03G 15/0812

FOREIGN PATENT DOCUMENTS

JP 2001-318534 A 11/2001
JP 2005-121826 A 5/2005
JP 2017-227674 A 12/2017

* cited by examiner

*Primary Examiner* — Jessica L Eley
(74) *Attorney, Agent, or Firm* — VENABLE LLP

(57) ABSTRACT

With respect to a rotational direction of a rotatable developing member of a developing device, an opposing position where a regulating portion of the developing device is opposed to an outer peripheral surface of the rotatable developing member is between a first maximum position and a position where a magnetic flux density of a regulating pole in a tangential direction relative to the outer peripheral surface of the rotatable developing member is zero. With respect to the rotational direction of the rotatable developing member, the position where the magnetic flux density of the regulating pole in the tangential direction relative to the outer peripheral surface of the rotatable developing member is zero is within a range of ±2° of a midpoint between the first maximum position and a second maximum position or is downstream of the range.

14 Claims, 10 Drawing Sheets

DEVELOPING DEVICE

This application claims the benefit of Japanese Patent Application No. 2021-102397 filed on Jun. 21, 2021, which is hereby incorporated by reference herein in its entirety.

FIELD OF THE INVENTION AND RELATED ART

The present invention relates to a developing device for use in an image forming apparatus such as a copying machine, a printer, a facsimile machine, and a multi-function machine having a plurality of functions of these machines.

In the developing device, conventionally, one using a two-component developer containing toner comprising non-magnetic particles and a carrier comprising magnetic particles (hereinafter, the two-component developer is simply referred to as the developer) has been known. In such a developing device, the developer is carried on a surface of a developing sleeve (developer carrying member) in which a magnet roller is provided and is fed by rotation of the developing sleeve. The developer is regulated in developer amount (layer thickness) by a regulating member provided close to the developing sleeve, and then is fed to a developing region opposing a photosensitive drum (image bearing member). Then, an electrostatic latent image formed on the photosensitive drum is developed with the toner in the developer.

In the case of such a constitution, when a positional relationship between a magnetic flux density distribution of the magnet roller and the regulating member is deviated, an amount of the developer regulated by the regulating member and fed to a developing portion changes. In U.S. Patent Publication No. US2017/0235248, a constitution in which a magnetic flux density distribution such that a magnetic flux density Br of a regulating pole, of a plurality of magnetic poles of a magnet roller, in a normal direction relative to the regulating pole opposing a regulating member has two maximum values (peaks) is formed and in which the regulating member is provided opposed to a position between two positions is disclosed.

In the case of the constitution of US 2017/0235248, the magnetic flux density Br of the regulating pole in the normal direction has the magnetic flux density distribution including the two maximum values (peaks) can be made moderate with respect to a rotational direction (θ direction) of a developing sleeve. For this reason, even when the positional relationship between the magnetic flux density distribution of the magnet roller and the regulating member is deviated, a fluctuation in amount of the developer (developer coating) regulated by the regulating member and fed to the developing portion can be suppressed.

However, the developer amount regulated by the regulating member is influenced not only by the magnetic flux density Br in the normal direction but also by a magnetic flux density Bθ in a tangential direction. Here, when the rotational direction (downstream direction) of the developing sleeve is a positive direction of a θ axis (tangential direction), in general, on a side upstream of a magnetic pole, a tangential component Bθ of the magnetic flux density is liable to become negative, and on a side downstream of the magnetic pole, a tangential component Bθ of the magnetic flux density is liable to become positive. This is because a line of magnetic flux extends in a radial shape from a peak position of the magnetic pole, and therefore, the line of magnetic flux extends in an upstream direction (negative direction) on the side upstream of the magnetic pole and extends in the downstream direction (positive direction) on the side downstream of the magnetic pole.

According to study of the present inventors, it was found that in the case where the magnetic flux density Bθ in the tangential direction at a position where the regulating member opposes the regulating magnetic pole is positive, compared with the case where the magnetic flux density Bθ is negative, a fluctuation in developer amount when the positional relationship with the regulating member is deviated is liable to become large. For this reason, even in the magnetic flux density distribution in which the magnetic flux density Br of the regulating magnetic pole in the normal direction has the two maximum values (peaks), in a relationship with the magnetic flux density Bθ in the tangential direction, in the case where the positional relationship between the magnetic flux density distribution of the magnet roller and the regulating member is deviated, there is a liability that the fluctuation in developer amount regulated by the regulating member becomes large.

SUMMARY OF THE INVENTION

A principal object of the present invention is to provide a developing device capable of stabilizing a developer coating amount in a constitution in which a magnetic flux density of a regulating magnetic pole in a normal direction has two maximum values.

According to an aspect of the present invention, there is provided a developing device comprising: a developing container configured to contain a developer containing toner and a carrier; a rotatable developing member configured to carry and feed the developer to a developing position; a magnet provided non-rotatably and stationarily inside the rotatable developing member and provided with a regulating pole; and a regulating portion configured to regulate an amount of the developer carried on the rotatable developing member by a magnetic force of the regulating pole, wherein with respect to a rotational direction of the rotatable developing member, a minimum position where a magnetic flux density of the regulating pole in a normal direction relative to an outer peripheral surface of the rotatable developing member is a minimum value is downstream of a first maximum position where the magnetic flux density of the regulating pole in the normal direction relative to the outer peripheral surface of the rotatable developing member is a first maximum value, and is upstream of a second maximum position where the magnetic flux density of the regulating pole in the normal direction relative to the outer peripheral surface of the rotatable developing member is a second maximum value, wherein with respect to the rotational direction of the rotatable developing member, an angle between the first maximum position and the second maximum position is 20° or more and less than 50°, wherein with respect to the rotational direction of the rotatable developing member, a position where the magnetic flux density of the regulating pole in a tangential direction relative to the outer peripheral surface of the rotatable developing member is zero is between the first maximum position and the second maximum position, wherein with respect to the rotational direction of the rotatable developing member, an opposing position where the regulating portion is opposed to the outer peripheral surface of the rotatable developing member is between the first maximum position and the position where the magnetic flux density of the regulating pole in the tangential direction relative to the outer peripheral surface of the rotatable developing member is zero, and wherein with respect to the rotational direction of the rotatable developing member, the position where the magnetic flux density of the regulating pole in the tangential direction relative to the outer peripheral surface of the rotatable developing member is zero is within a range of ±2° of a midpoint between the first maximum position and the second maximum position or is downstream of the range.

According to another aspect of the present invention, there is provided a developing device comprising: a developing container configured to contain a developer containing toner and a carrier; a rotatable developing member configured to carry and feed the developer to a developing position; a magnet provided non-rotatably and stationarily inside the rotatable developing member and provided with a regulating pole, an upstream-side magnetic pole adjacent to the regulating pole on a side upstream of the regulating pole with respect to a rotational direction of the rotatable developing member, and a downstream-side magnetic pole provided adjacent to the regulating pole on a side downstream of the regulating pole with respect to the rotational direction of the rotatable developing member; and a regulating portion configured to regulate an amount of the developer carried on the rotatable developing member by a magnetic force of the regulating pole, wherein with respect to the rotational direction of the rotatable developing member, a minimum position where a magnetic flux density of the regulating pole in a normal direction relative to an outer peripheral surface of the rotatable developing member is a minimum value is downstream of a first maximum position where the magnetic flux density of the regulating pole in the normal direction relative to the outer peripheral surface of the rotatable developing member is a first maximum value, and is upstream of a second maximum position where the magnetic flux density of the regulating pole in the normal direction relative to the outer peripheral surface of the rotatable developing member is a second maximum value, wherein with respect to the rotational direction of the rotatable developing member, an angle between the first maximum position and the second maximum position is 20° or more and less than 50°, wherein with respect to the rotational direction of the rotatable developing member, a position where the magnetic flux density of the regulating pole in a tangential direction relative to the outer peripheral surface of the rotatable developing member is zero is between the first maximum position and the second maximum position, wherein with respect to the rotational direction of the rotatable developing member, an opposing position where the regulating portion is opposed to the outer peripheral surface of the rotatable developing member is between the first maximum position and the position where the magnetic flux density of the regulating pole in the tangential direction relative to the outer peripheral surface of the rotatable developing member is zero, wherein with respect to the rotational direction of the rotatable developing member, an absolute value of a maximum value of a magnetic flux density of the upstream-side magnetic pole in the normal direction relative to the outer peripheral surface of the rotatable developing member is smaller than an absolute value of a maximum value of a magnetic flux density of the downstream-side magnetic pole in the normal direction relative to the outer peripheral surface of the rotatable developing member, and wherein an absolute value of the first maximum value is smaller than an absolute value of the second maximum value.

According to another aspect of the present invention, there is provided a developing device comprising: a developing container configured to contain a developer containing toner and a carrier; a rotatable developing member configured to carry and feed the developer to a developing position; a magnet provided non-rotatably and stationarily inside the rotatable developing member and provided with a regulating pole and an upstream-side magnetic pole provided adjacent to the regulating pole on a side upstream of the regulating pole with respect to a rotational direction of the rotatable developing member; and a regulating portion configured to regulate an amount of the developer carried on the rotatable developing member by a magnetic force of the regulating pole, wherein with respect to the rotational direction of the rotatable developing member, a minimum position where a magnetic flux density of the regulating pole in a normal direction relative to an outer peripheral surface of the rotatable developing member is a minimum value is downstream of a first maximum position where the magnetic flux density of the regulating pole in the normal direction relative to the outer peripheral surface of the rotatable developing member is a first maximum value, and is upstream of a second maximum position where the magnetic flux density of the regulating pole in the normal direction relative to the outer peripheral surface of the rotatable developing member is a second maximum value, wherein with respect to the rotational direction of the rotatable developing member, an angle between the first maximum position and the second maximum position is 20° or more and less than 50°, wherein with respect to the rotational direction of the rotatable developing member, a position where the magnetic flux density of the regulating pole in a tangential direction relative to the outer peripheral surface of the rotatable developing member is between the first maximum position and the second maximum position, wherein with respect to the rotational direction of the rotatable developing member, an opposing position where the regulating portion is opposed to the outer peripheral surface of the rotatable developing member is between the first maximum position and the position where the magnetic flux density of the regulating pole in the tangential direction relative to the outer peripheral surface of the rotatable developing member is zero, and wherein an absolute value of a maximum value of a magnetic flux density of the upstream-side magnetic pole in the normal direction relative to the outer peripheral surface of the rotatable developing member is larger than an absolute value of the first maximum value.

According to a further aspect of the present invention, there is provided a developing device comprising: a developing container configured to contain a developer containing toner and a carrier; a rotatable developing member configured to carry and feed the developer to a developing position; a magnet provided non-rotatably and stationarily inside the rotatable developing member and provided with a regulating pole, an upstream-side magnetic pole adjacent to the regulating pole on a side upstream of the regulating pole with respect to a rotational direction of the rotatable developing member, and a downstream-side magnetic pole provided adjacent to the regulating pole on a side downstream of the regulating pole with respect to the rotational direction of the rotatable developing member; and a regulating portion configured to regulate an amount of the developer carried on the rotatable developing member by a magnetic force of the regulating pole, wherein with respect to the rotational direction of the rotatable developing member, a minimum position where a magnetic flux density of the regulating pole in a normal direction relative to an outer peripheral surface of the rotatable developing member is a minimum value is downstream of a first maximum position where the magnetic flux density of the regulating pole in the normal direction relative to the outer peripheral surface of the rotatable developing member is a first maximum value, and is upstream of a second maximum position where the magnetic flux density of the regulating pole in the normal direction relative to the outer peripheral surface of the rotatable developing member is a second maximum value, wherein with respect to the rotational direction of the rotatable developing member, an angle between the first maximum position and the second maximum position is 20° or more and less than 50°, wherein with respect to the rotational direction of the rotatable developing member, a position where the magnetic flux density of the regulating pole in a tangential direction relative to the outer peripheral surface of the rotatable developing member is zero is between the first maximum position and the second maximum position, wherein with respect to the rotational direction of the rotatable developing member, an opposing position where the regulating portion is opposed to the outer peripheral surface of the rotatable developing member is between the first maximum position and the position where the magnetic flux density of the regulating pole in the tangential direction relative to the outer peripheral surface of the rotatable developing member is zero, and wherein with respect to the rotational direction of the rotatable developing member, an absolute value of a maximum value of a magnetic flux density of the upstream-side magnetic pole in the normal direction relative to the outer peripheral surface of the rotatable developing member is larger than an absolute value of a maximum value of a magnetic flux density of the downstream-side magnetic pole in the normal direction relative to the outer peripheral surface of the rotatable developing member.

Further features of the present invention will become apparent from the following description of exemplary embodiments with reference to the attached drawings.

Figure 5:
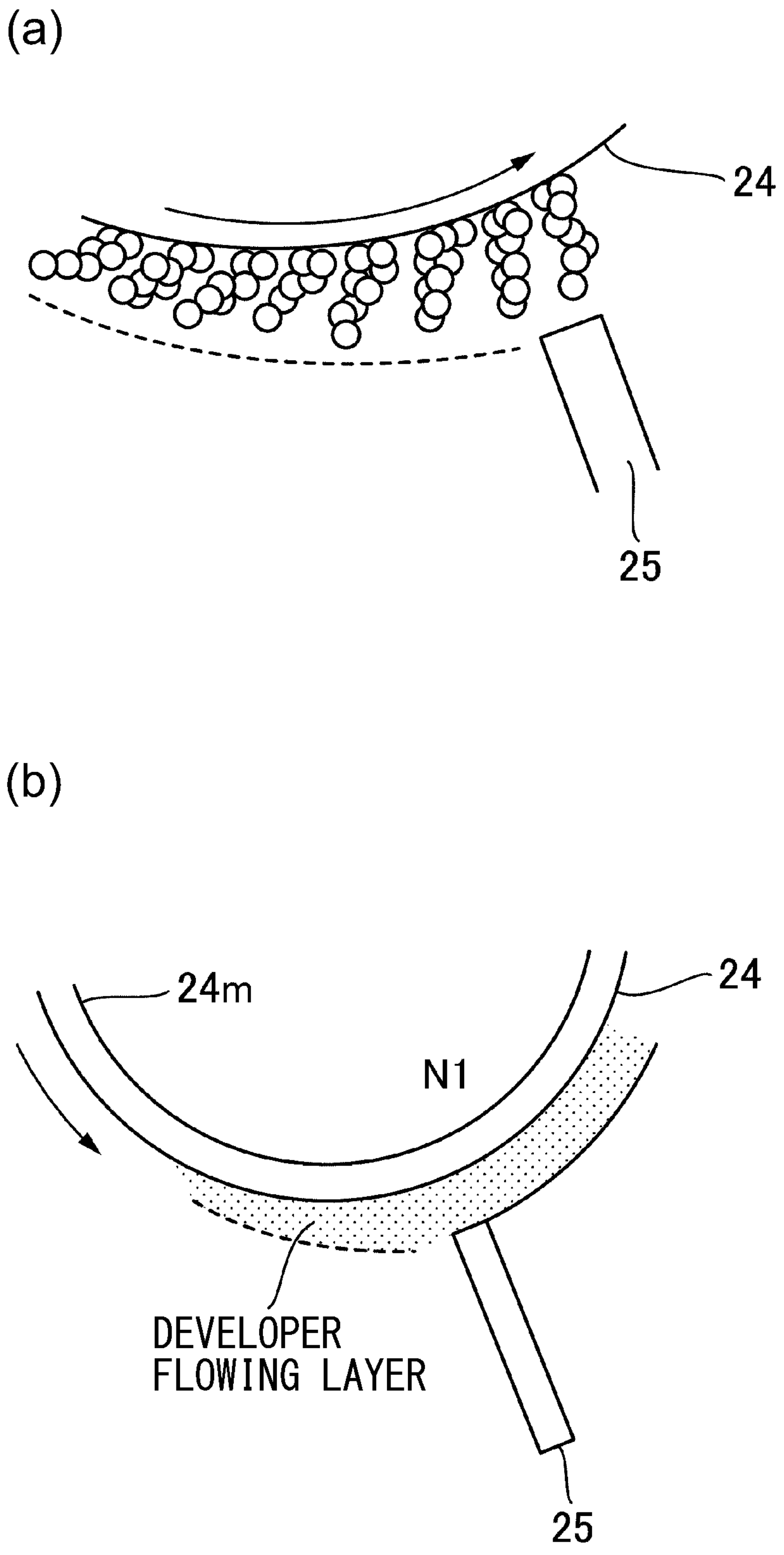

Parts (a) and (b) of FIG. 5 are schematic views showing the case where the regulating member is provided opposed to a region in which the magnetic flux density Bθ of a regulating magnetic pole of the developing sleeve in the tangential direction is negative, wherein part (a) shows a behavior of magnetic chains on the developing sleeve, and part (b) shows a developer flowing layer in the neighborhood of a stagnant developer.

Figure 6:
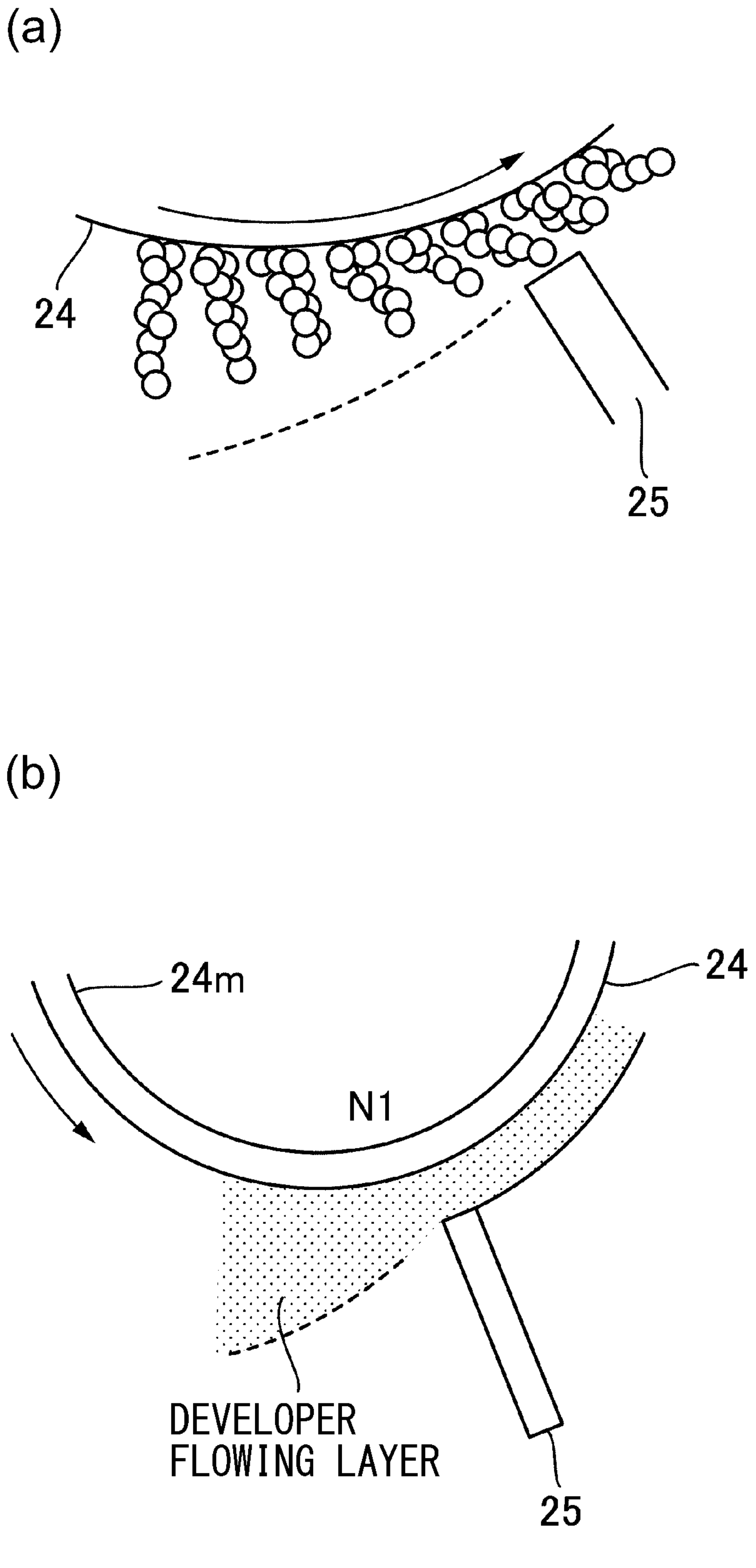

Parts (a) and (b) of FIG. 6 are schematic views showing the case where the regulating member is provided opposed to a region in which the magnetic flux density Bθ of the regulating magnetic pole of the developing sleeve in the tangential direction is positive, wherein part (a) shows a behavior of magnetic chains on the developing sleeve, and part (b) shows a developer flowing layer in the neighborhood of a stagnant developer.

Figure 7:
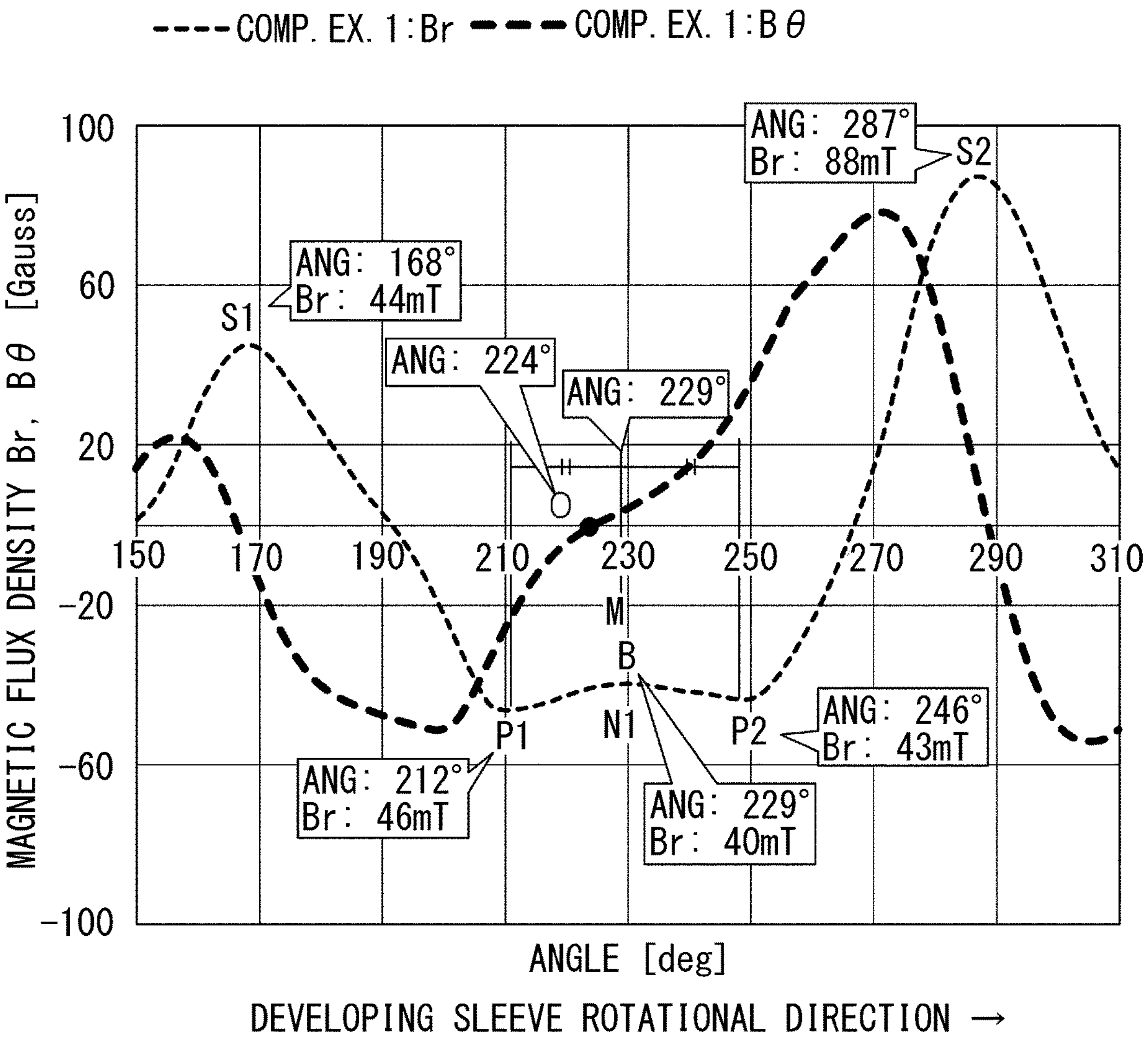

FIG. 7 is a graph showing the relationship between the angle with the regulating member arrangement region, as the center, of the developing sleeve, the magnetic flux density Br in the normal direction, and the magnetic flux density Bθ in the tangential direction, according to the comparison example 1.

Figure 8:
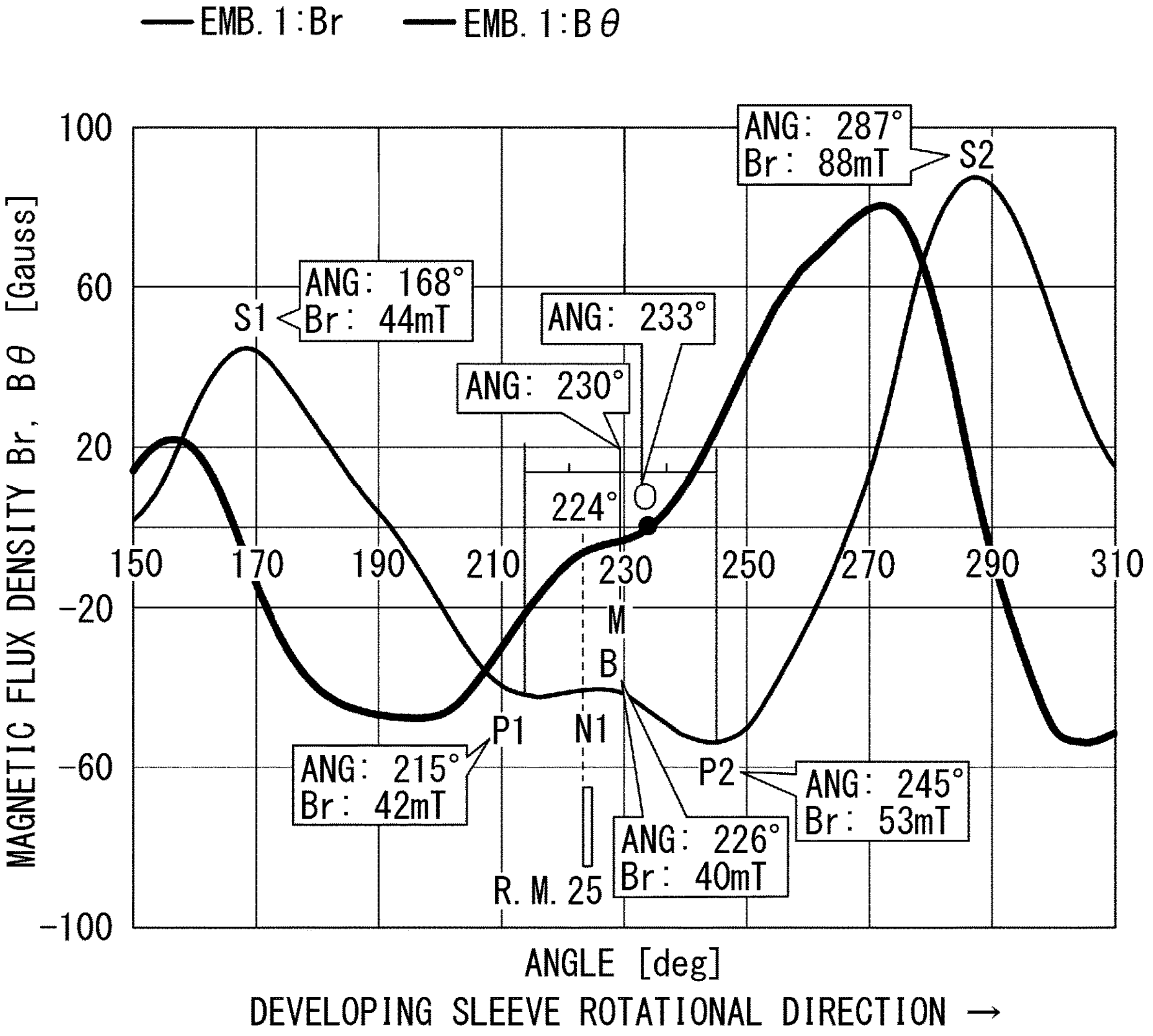

FIG. 8 is a graph showing the relationship between the angle with the regulating member arrangement region, as the center, of the developing sleeve, the magnetic flux density Br in the normal direction, the magnetic flux density Bθ in the tangential direction, according to the embodiment 1.

Figure 9:
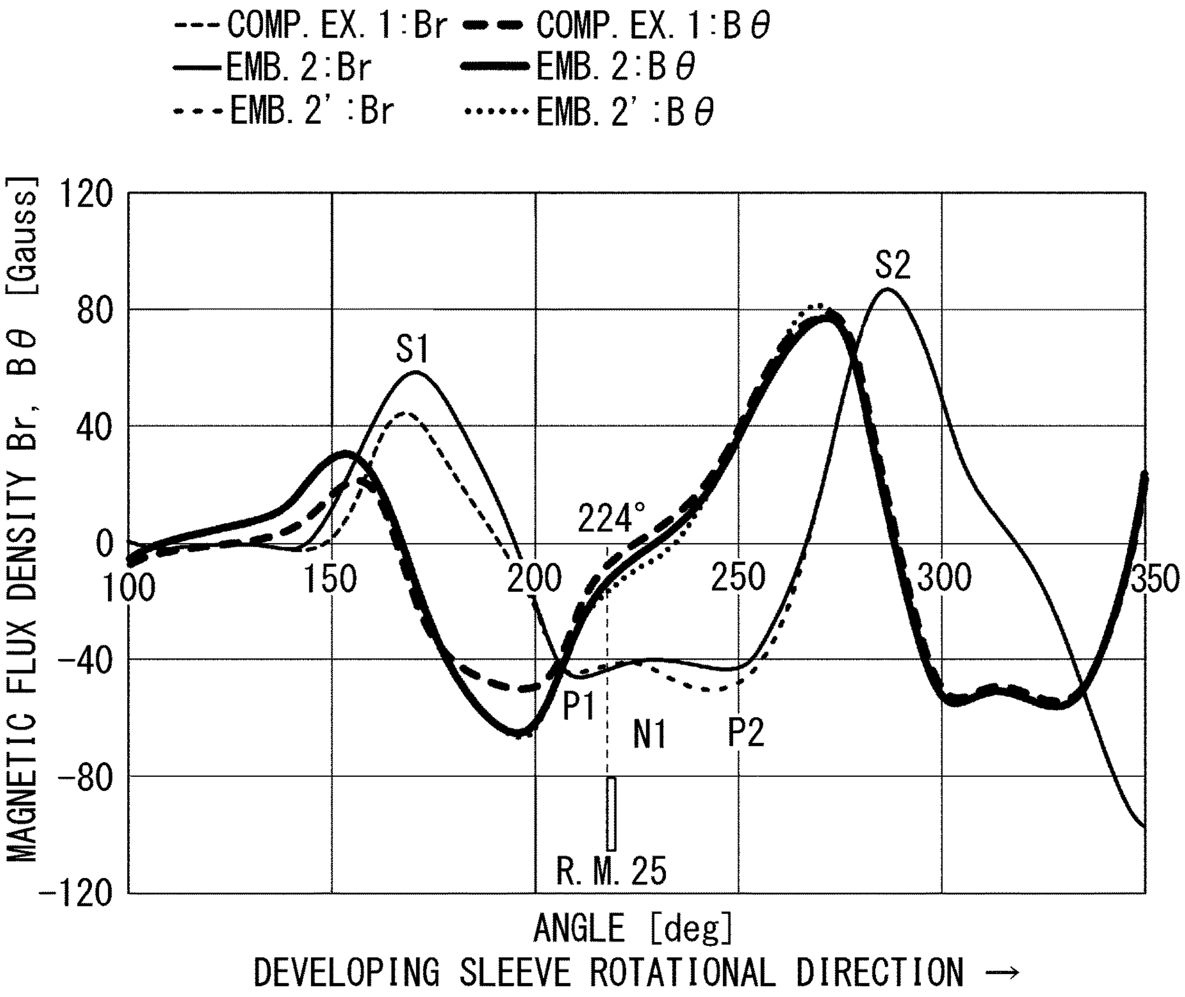

FIG. 9 is a graph showing a relationship between an angle with a regulating member arrangement region, as a center, of a developing sleeve, a magnetic flux density Br in the normal direction, and a magnetic flux density Bθ in the tangential direction, according to each of embodiments 2 and 2' and a comparison example 1 in a second embodiment.

Figure 10:
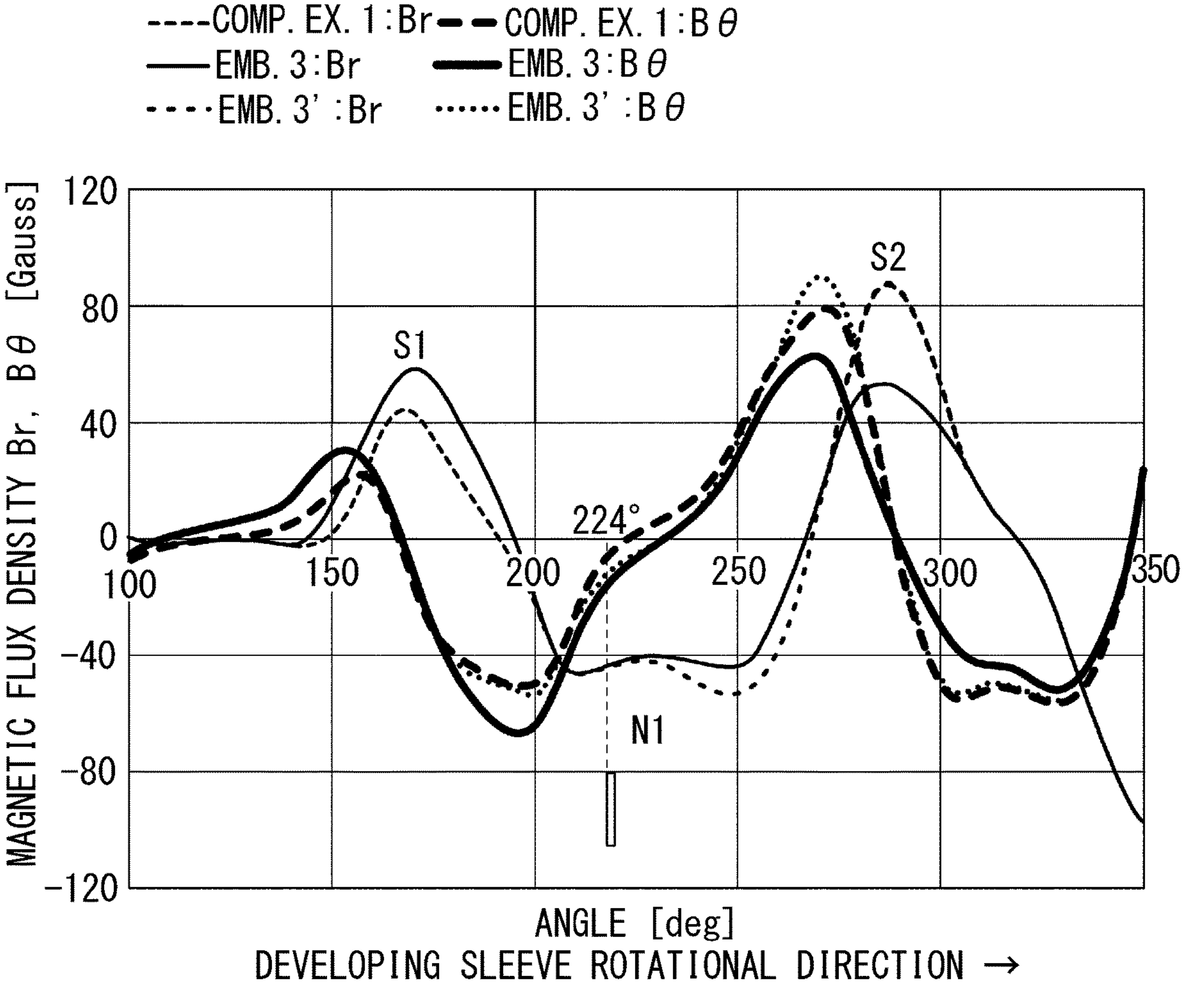

FIG. 10 is a graph showing a relationship between an angle with a regulating member arrangement region, as a center, of a developing sleeve, a magnetic flux density Br in the normal direction, and a magnetic flux density Bθ in the tangential direction, according to each of embodiments 3 and 3' and a comparison example 1 in a third embodiment.

DESCRIPTION OF THE EMBODIMENTS

First Embodiment

A first embodiment will be described using FIGS. 1 to 8. Incidentally, in this embodiment, the case where a developing device is applied to a full-color printer of a tandem type as an example of an image forming apparatus is described.

[Image Forming Apparatus]

First, a schematic structure of an image forming apparatus 1 will be described using FIG. 1.

In this embodiment, the image forming apparatus 1 is of a type in which an intermediary transfer belt 44*b* is provided and toner images of respective colors are primary-transferred from photosensitive drums 81*y* to 81*k* onto the intermediary transfer belt 44*b* and thereafter composite toner images of the respective colors are secondary-transferred altogether from the intermediary transfer belt 44*b* onto a sheet S. However, the image forming apparatus is not limited thereto, but may also employ a type in which a toner image is directly transferred from a photosensitive drum onto a sheet fed by a sheet feeding belt.

Further, in this embodiment, as a developer, a two-component developer which is a mixture of non-magnetic toner and a magnetic carrier is used. The toner incorporates colorant, a wax component and the like in a resin material such as polyester or styrene and is formed by pulverization or polymerization. The carrier is formed by subjecting a surface layer of a core consisting of resin particles, with which ferrite particles or magnetic powder is kneaded, to resin coating.

Figure 1:
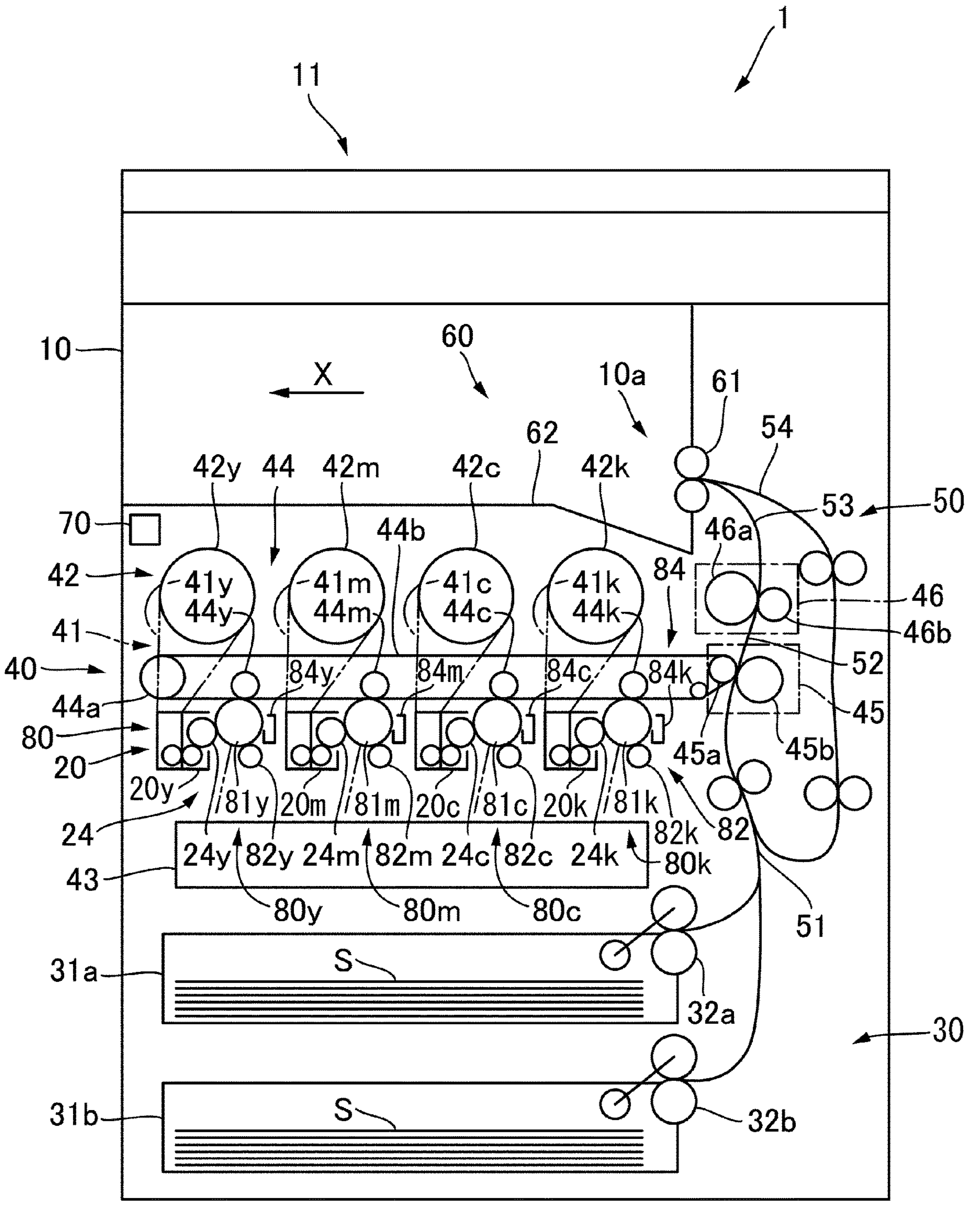
FIG. 1 is a schematic structural sectional view of an image forming apparatus according to a first embodiment.

As shown in FIG. 1, the image forming apparatus 1 includes an image forming apparatus main assembly (hereinafter, referred to as an apparatus main assembly) 10 as a casing. The apparatus main assembly 10 includes an image reading portion 11, a sheet feeding portion 30, an image forming portion 40, a sheet feeding (conveying) portion 50, a sheet discharging portion 60, and a controller 70. On the sheet S as a recording material, the toner image is to be formed, and specific examples of the sheet S may include plain paper, a resin-made material sheet as a substitute for the plain paper, thick paper, a sheet for an overhead projector, and the like.

The image reading portion 11 is provided at an upper portion of the apparatus main assembly 10. The image reading portion 11 includes an unshown platen glass as an original mounting table, an unshown light source for irradiating an original, placed on the platen glass, with light, and an unshown image sensor for converting reflected light into a digital signal, and the like member.

The sheet feeding portion 30 is disposed at a lower portion of the apparatus main assembly 10, and includes sheet cassettes 31*a* and 31*b* for stacking and accommodating the sheets S such as recording paper and includes feeding rollers 32*a* and 32*b*, and feeds the accommodated sheet S to the image forming portion 40.

The image forming portion 40 includes image forming units 80, toner hoppers 41, toner containers 42, a laser scanner 43, an intermediary transfer unit 44, a secondary transfer portion 45 and a fixing device 46. The image forming portion 40 is capable of forming an image on the sheet S on the basis of image information.

Incidentally, the image forming apparatus 1 in this embodiment meets full-color image formation, and the image forming units 80*y*, 80*m*, 80*c*, 80*k* have similar constitutions for four colors of yellow (y), magenta (m), cyan (c), black (k), respectively, and are separately provided. Also the toner hoppers 41*y*, 41*m*, 41*c*, 41*k* and the toner containers 42*y*, 42*m*, 42*c*, 42*k* similarly have the same constitution for the four colors of yellow (y), magenta (m), cyan (c), black (k), respectively, and are separately provided. For this reason, in FIG. 1, respective constituent elements for the four colors are represented by identifiers for the colors, but in FIG. 2 and in the specification, are described using only reference numerals or symbols without adding the identifiers for the colors in some cases.

The toner containers 42 are, for example, cylindrical bottles, and the toners are accommodated, and above the respective image forming unit 80, the toner container 42 is connected and disposed through the toner hopper 41. The laser scanner 43 exposes the surface of the photosensitive drum 81, electrically charged by the charging roller 82, to light and thus an electrostatic latent image is formed on the surface of the photosensitive drum 81.

The image forming unit 80 includes the four image forming units 80*y*, 80*m*, 80*c*, 80*k* for forming toner images of the four colors. The image forming units 80*y*, 80*m*, 80*c*, 80*k* include the photosensitive drums (image bearing member) 81*y*, 81*m*, 81*c*, 81*k* for forming the toner image, the charging rollers 82*y*, 82*m*, 82*c*, 82*k*, a developing devices 20*y*, 20*m*, 20*c*, 20*k*, and cleaning blades 84*y*, 84*m*, 84*c*, 84*k*. Further, the photosensitive drums 81*y*, 81*m*, 81*c*, 81*k*, the charging roller 82*y*, 82*m*, 82*c*, 82*k*, the developing devices 20*y*, 20*m*, 20*c*, 20*k*, the cleaning blades 84*y*, 84*m*, 84*c*, 84*k*, and developing sleeves 24 described later have the same constitution for the four colors of yellow (y), magenta (m), cyan (c), black (k), respectively, and are separately provided. For this reason, in FIG. 1, respective constituent elements for the four colors are represented by identifiers for the colors, but in FIG. 2 and in the specification, are described using only reference numerals or symbols without adding the identifiers for the colors in some cases.

The photosensitive drum 81 as the image bearing member includes a photosensitive layer formed on an outer peripheral surface of an aluminum cylinder so as to have a negative charge polarity, and is rotated in an arrow direction at a predetermined process speed (peripheral speed). The charging roller 82 as a charging member contacts the surface of the photosensitive drum 81 and electrically charges the surface of the photosensitive drum 81 to, e.g., a uniform negative dark-portion potential. After the charging, at each of the respective surfaces of the photosensitive drums 81, an electrostatic latent image is formed on the basis of image information by the laser scanner 43 as an exposure device. Each of the photosensitive drums 81 carries the formed electrostatic image and is circulated and moved, and the electrostatic latent image is developed with the toner by the developing device 20. Details of a structure of the developing device 20 will be described later.

The toner image obtained by developing the electrostatic image is primary-transferred onto the intermediary transfer belt 44*b* described later. The surface of the photosensitive drum 81 after the primary transfer is discharged by an unshown pre-exposure portion. The cleaning blade 84 as a cleaning member is disposed in contact with the surface of the photosensitive drum 81 and removes a residual matter such as transfer residual toner remaining on the surface of the photosensitive drum 81 after the primary transfer.

The intermediary transfer unit 44 is disposed above the image forming units 80*y*, 80*m*, 80*c* and 80*k*. The intermediary transfer unit 44 includes a plurality of rollers (stretching members) such as a driving roller 44*a*, a follower roller 44*d*, primary transfer rollers 44*y*, 44*m*, 44*c* and 44*k*, and the intermediary transfer belt 44*b* as an intermediary transfer member wound around these rollers. The primary transfer rollers 44*y*, 44*m*, 44*c* and 44*k* are disposed opposed to the photosensitive drums 81, 81*m*, 81*c* and 81*k*, respectively, and are disposed in contact with the intermediary transfer belt 44*b*.

A positive-polarity transfer bias is applied to the intermediary transfer belt 44*b* by the primary transfer rollers 44*y*, 44*m*, 44*c* and 44*k*, whereby toner images having the negative polarity are superposedly transferred successively from the photosensitive drums 81*y*, 81*m*, 81*c* and 81*k* onto the intermediary transfer belt 44*b*. By this, the intermediary transfer 44*b* is circulated and moved in a state in which a full-color image is formed on an outer peripheral surface thereof.

The secondary transfer portion 45 includes a secondary transfer inner roller 45*a* and a secondary transfer outer roller 45*b*. By applying a positive-polarity secondary transfer bias to the secondary transfer outer roller 45*b*, the full-color image formed on the intermediary transfer belt 44*b* is transferred onto the sheet S. The fixing device 46 includes a fixing roller 46*a* and a pressing roller 46*a*. The sheet S is nipped and fed between the fixing roller 46*a* and the pressing roller 46*b*, so that the toner image transferred on the sheet S is heated and pressed and thus is fixed on the sheet S.

The sheet feeding portion 50 includes a pre-secondary transfer feeding path 51, a pre-fixing feeding path 52, a discharging path 53, a re-feeding path 54, and feeds the sheet S, fed from the sheet feeding portion 30, from the image forming portion 40 to the sheet discharging portion 60.

The sheet discharging portion 60 includes a discharging roller pair 61 provided in a downstream side of the discharging path 53, a discharge tray 62 provided on a side downstream of the discharging roller pair 61. The discharging roller pair 61 feeds the sheet S fed from the discharging path 53 through a nip thereof, and discharges the sheet S through a discharge opening 10*a* formed on the apparatus main assembly 10. The discharge tray 62 is a face-down tray, and the sheet S discharged through the discharge opening 10*a* in an arrow X direction is stacked on the discharge tray 62.

The controller 70 is constituted by a computer and, e.g., includes a CPU, an ROM for storing a program for controlling respective portions, an RAM for temporarily storing data, and an input-and-output circuit for inputting and outputting signals relative to an external device. The CPU is a microprocessor for effecting entire control of the image forming apparatus 1 and is a principal part of a system controller. The CPU is connected via the input-and-output circuit with each of the image recording portion 11, the sheet feeding portion 30, the image forming portion 40, the sheet feeding portion 50, the sheet discharging portion 60 and an operating portion, and transfers signals with the respective portions and controls operations of the respective portions.

Next, an image forming operation in the image forming apparatus 1 constituted as described above will be described.

When the image forming operation is started, first, the photosensitive drum 81 is rotated, and the surface thereof is electrically charged by the charging roller 52. Then, the laser scanner 43 emits, on the basis of image information, laser light toward the surface of the photosensitive drum 81, so that the electrostatic latent image is formed on the surface of the photosensitive drum 81. The toner is deposited on the electrostatic latent image, so that the electrostatic latent image is developed (visualize) into a toner image, and then the toner image is transferred onto the intermediary transfer belt 44*b*.

On the other hand, in parallel to such a toner image forming operation, the feeding rollers 32*a* and 32*b* are rotated and feed the uppermost sheet S in the sheet cassettes 31*a* and 31*b* while separating the sheet S. Then, the sheet S is fed to the secondary transfer portion 45 via the pre-secondary transfer feeding path 51 by being timed to the toner image on the intermediary transfer belt 44*b*. Then, the toner image is transferred from the intermediary transfer belt 44*b* onto the sheet S, and the sheet S is fed into the fixing device 46, in which the unfixed toner image is heated and pressed, thus is fixed on the surface of the sheet S. The sheet S is discharged through the discharge opening 10*a* by the discharging roller pair 61, and is stacked on the discharge tray 62.

[Developing Device]

Figure 2:
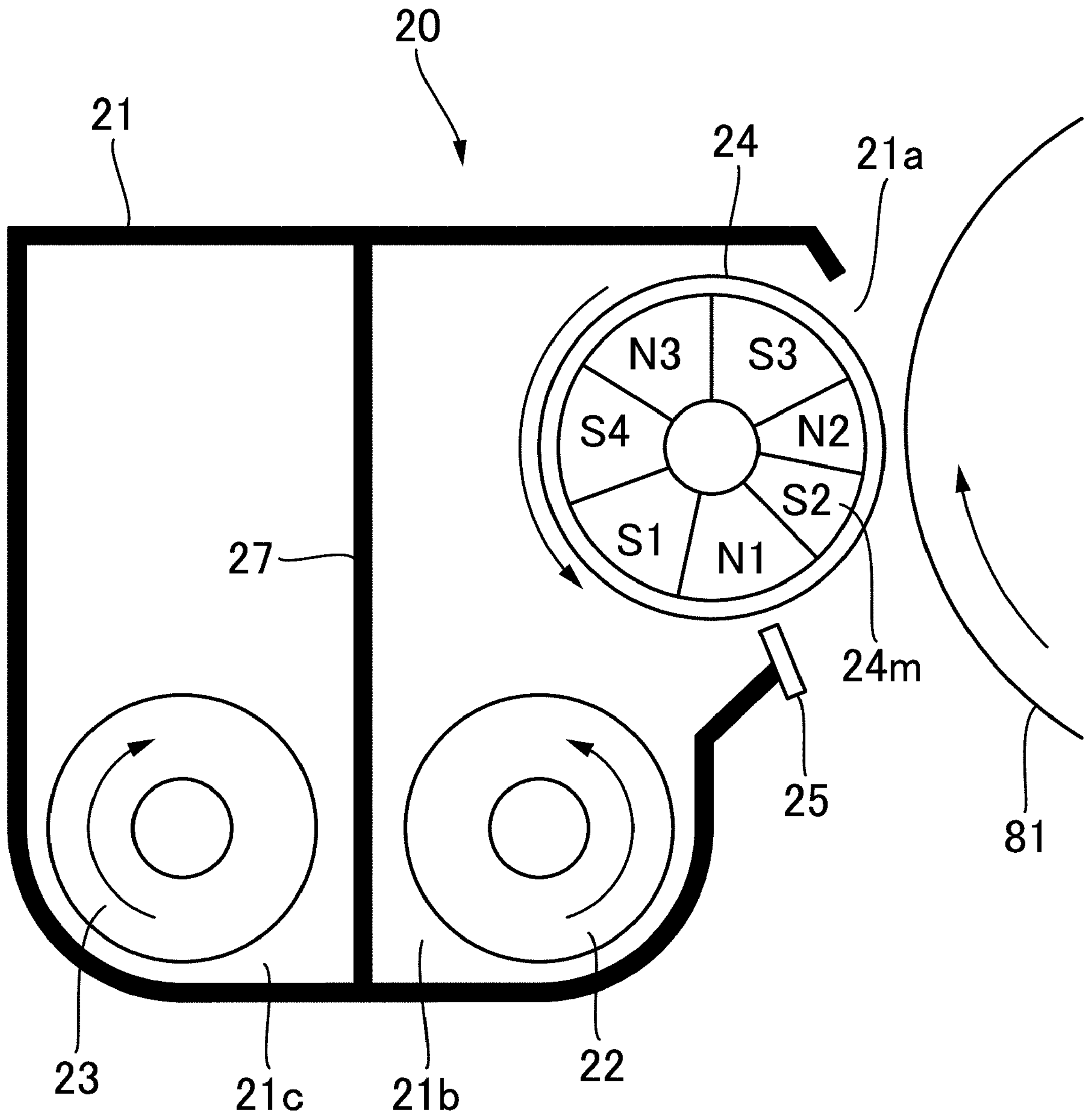
FIG. 2 is a schematic structural sectional view of a developing device according to the first embodiment.

Next, the developing device 20 will be specifically described with reference to FIG. 2. The developing device 20 includes a developing (developer) container 21 accommodating the developer, a first screw 22 and a second feeding screw 23, the developing sleeve 24, and a regulating member (regulating blade in this embodiment) 25. The developing container 21 is provided with an opening 21*a* where the developing sleeve 24 is exposed at a position opposing the photosensitive drum 81.

Into the developing container 21, the toner is supplied from the toner container 42 (FIG. 1) in which the toner is filled. The developing container 21 includes a partition wall 27 extending in a longitudinal direction substantially at a central portion. The developing container 21 is partitioned by the partition wall 27 into a developing chamber 21*b* and a stirring chamber 21*c* with respect to a horizontal direction. The developer is accommodated in the developing chamber 21*b* and the stirring chamber 21*c*. In the developing chamber 21*b*, the developer is fed to the developing sleeve 24. The stirring chamber 21*c* communicates with the developing chamber 21*b*, and the developer is collected from the developing sleeve 24 and is stirred.

The first feeding screw 22 is disposed in the developing chamber 21*b* along an axial direction of the developing sleeve 24 and substantially parallel with the developing sleeve 24. The second feeding screw 23 is disposed in the stirring chamber 21*c* substantially in parallel with a shaft of the first feeding screw 22, and feeds the developer in the stirring chamber 21*c* in a direction opposite to a feeding direction of the first feeding screw 22. That is, the developing chamber 21*b* and the stirring chamber 21*c* constitute a circulation path of the developer along which the developer is fed while being stirred. The toner is triboelectrically charged to the negative polarity through sliding with the carrier by being stirred by the respective screws 22 and 23.

The developer in the developing container 21 is carried on the developing sleeve 24 by a magnet roller 24*m* fixedly provided inside the rotatable developing sleeve 24. Thereafter, the developer on the developing sleeve 24 is regulated in developer amount (layer thickness) by the regulating member 25, and is fed to a developing region opposing the photosensitive drum 81 by rotation of the developing sleeve 24. The developer is contacted to the photosensitive drum 81, whereby the toner is supplied to the photosensitive drum 81, so that the electrostatic latent image on the photosensitive drum 81 is developed as the toner image. At this time, between the photosensitive drum 81 and the developing sleeve 24, a developing bias in a superimposed form including a DC voltage and an AC voltage is applied so that the toner jumps to the electrostatic latent image.

The developing sleeve 24 as a developer carrying member carries the developer including the non-magnetic toner and the magnetic carrier and rotationally feeds the developer to the developing region opposing the photosensitive drum 81. The developing sleeve 25 is 20 mm in diameter, for example, and has a cylindrical shape, and is constituted by a non-magnetic material such as aluminum or non-magnetic stainless steel, and is formed in this embodiment by aluminum.

The regulating member 25 opposes a regulating magnetic pole N1 of the magnet roller 24*m* and is provided on the developing container 21. Further, the regulating member 25 includes a developing portion which is provided opposed to and in non-contact with the developing sleeve 24 and which is for regulating an amount of the developer carried on the developing sleeve 24. That is, the regulating member 25 is fixed to the developing container 21 in a state in which a free end (regulating portion) thereof is spaced from the developing sleeve 24 with a predetermined interval, and regulates a layer thickness of the developer by cutting of the magnetic chain of the developer carried on the surface of the developing sleeve 24 by a magnetic force (magnetic attraction force) of the regulating magnetic pole N1. Such a regulating member 25 is consisting of a metal plate (for example, an SUS plate) disposed along a longitudinal direction of the developing sleeve 24, and passes through between the free end (regulating portion) of the regulating member 25 and the developing sleeve 24 and is sent to the developing region Da. Incidentally, the regulating member 25 may be either of a magnetic member or a non-magnetic member, but may preferably be the magnetic member from the following viewpoint. In the case of the magnetic member, a magnetic field is formed between the free end (magnet portion) of the regulating member 25 and the developing sleeve 24, and the magnetic attraction force acts on the surface of the regulating member 25. As a result, the developer is easily cut. Further, there is an advantage such that an interval between the free end (regulating portion) of the regulating member 25 and the developing sleeve 24 can be made large, and thus a foreign matter is not readily clogged.

On the other hand, in the case of the magnetic member, there is a liability that the developer is constrained by the magnetic field between the free end portion of the regulating member 25 and the positive 24 and thus a developer deterioration due to friction is liable to occur. Incidentally, the regulating member 25 may also be a regulating member in which a magnetic member is applied to a part of the non-magnetic member. By doing so, the advantage of the magnetic member is somewhat lost, but it is possible to suppress the developer deterioration. In this embodiment, as the regulating member 25, a regulating member consisting only of the magnetic member was used. For that reason, there is a liability that the developer is deteriorated, but by using the magnet roller 24*m* in combination, it becomes possible to suppress a deterioration of the developer.

Inside the developing sleeve 24, a roller-shaped magnet roller (magnetic field generating means, magnet) 24*m* is fixedly provided to the developing container 21 in a non-rotatable state. The magnet roller 24*m* includes a plurality of magnetic poles and generates a magnetic field for carrying the developer on the developing sleeve 24. The magnet roller 24*m* includes seven magnetic pieces each having a surface opposing the developing sleeve 24, namely a scooping magnetic pole S1, a regulating magnetic pole N1, a feeding magnetic pole S2, a developing magnetic pole N2, a feeding magnetic pole S3, a feeding magnetic pole N3, and a peeling magnetic pole S4. Incidentally, in this embodiment, the magnet roller consisting of the seven (magnetic poles is used, but the magnet roller may also include poles other than the seven poles. For example, a magnet roller consisting of five poles may be used.

However, as in this embodiment, in the case where the magnet roller 24*m* includes seven or more magnetic poles, each of the magnet pieces is liable to become small, so that the influence of a positional deviation of the regulating member on the regulating magnetic pole is liable to occur. For that reason, as in this embodiment, in the case where the magnet roller 24*m* includes the seven or more magnetic poles, an effect of employment of a constitution as described later becomes higher.

The scooping magnetic pole S1 is disposed opposed to the developing chamber 21*b*. The developing magnetic pole N1 is disposed opposed to the regulating member 25. The feeding magnetic pole S2 is disposed on a side upstream of the developing region with respect to a rotational direction. The developing magnetic pole N2 is disposed opposed to the developing region. The feeding magnetic pole S3 and the feeding magnetic pole N3 are disposed on a side downstream of the developing region Da with respect to the rotational direction. The peeling magnetic pole S3 is disposed adjacent to and upstream of the scooping magnetic pole S1 with respect to the rotational direction. Particularly, the regulating magnetic pole N1 as a first magnetic pole is disposed closest to the regulating member 25. Further, with respect to the rotational direction of the developing sleeve 24, the scooping magnetic pole S1 as a second magnetic pole (upstream-side magnetic pole) is disposed adjacent to the regulating magnetic pole N1 on a side upstream of the regulating magnetic pole N1. Further, with respect to the rotational direction of the developing sleeve 24, the feeding magnetic pole S2 as a third magnetic pole (downstream-side magnetic pole) is disposed adjacent to the regulating magnetic pole N1 on a side downstream of the regulating magnetic pole N1.

Next, an operation of the developing sleeve in this embodiment will be described on the basis of FIG. 2. The developing sleeve 24 rotates in an arrow direction, and the developer accommodated in the developing chamber 21*b* is attracted by the scooping magnetic pole S1 opposing the developing chamber 21*b* and is fed toward the regulating member 25. The developer is erected by the regulating magnetic pole N1 opposing the regulating member 25, and a layer thickness thereof is regulated by the regulating member 25 and passes through a gap (spacing) between the developing sleeve 24 and the regulating member 25, so that a developer layer having a predetermined layer thickness is formed on the developing sleeve 24.

The developer layer passes through the feeding magnetic pole S2, and is carried and fed to the developing region opposing the photosensitive drum 81 and then develops the electrostatic latent image, formed on the surface of the photosensitive drum 81, in a state in which the magnetic chains are formed by the developing magnetic pole N2 opposing the developing region.

The developer after being subjected to the development (of the electrostatic latent image) passes through the feeding magnetic poles S3 and N3 disposed downstream of the developing region with respect to the rotational direction and is peeled off of the developing sleeve 24 in a peeling region formed by repulsion of the peeling magnetic pole S4 and the scooping magnetic pole S1. The peeled developer is stirred and fed in the stirring chamber 21*c* and then is supplied again from the developing chamber 21*b* to the developing sleeve 24.

[Magnetic Flux Density Distribution Around Regulating Magnetic Pole]

Next, a magnetic flux density distribution around the regulating magnetic pole N1 of the magnet roller 24*m* in this embodiment will be described. The magnet roller 24*m* has a magnetic flux density distribution such that in the regulating magnetic pole N1 as the first magnetic pole, the magnetic flux density Br of the developing sleeve 24 in the normal direction relative to the outer peripheral surface of the developing sleeve 24 has an upstream maximum value P1, a minimum value B, and a downstream maximum value P2 in a named order from an upstream side toward a downstream side with respect to the rotational direction of the developing sleeve 24. Such a magnetic flux density distribution is hereinafter called two peaks in some cases. Incidentally, a magnetic flux density distribution, having one maximum value, of the regulating magnetic pole of the magnet roller is hereinafter called one peak in some cases. In the case of this embodiment, the magnet roller 24*m* with the two peaks is used, and the regulating member 25 is disposed so as to oppose a position between the upstream maximum value P1 and the downstream maximum value P2. Incidentally, in the following, the upstream maximum value P1 and the downstream maximum value P2 are also called an upstream peak P1 and a downstream peak P2, respectively. Further, a position of the upstream peak P1 and a position of the downstream peak P2 are also called simply the upstream peak P1 and the downstream peak P2, respectively.

Figure 3:
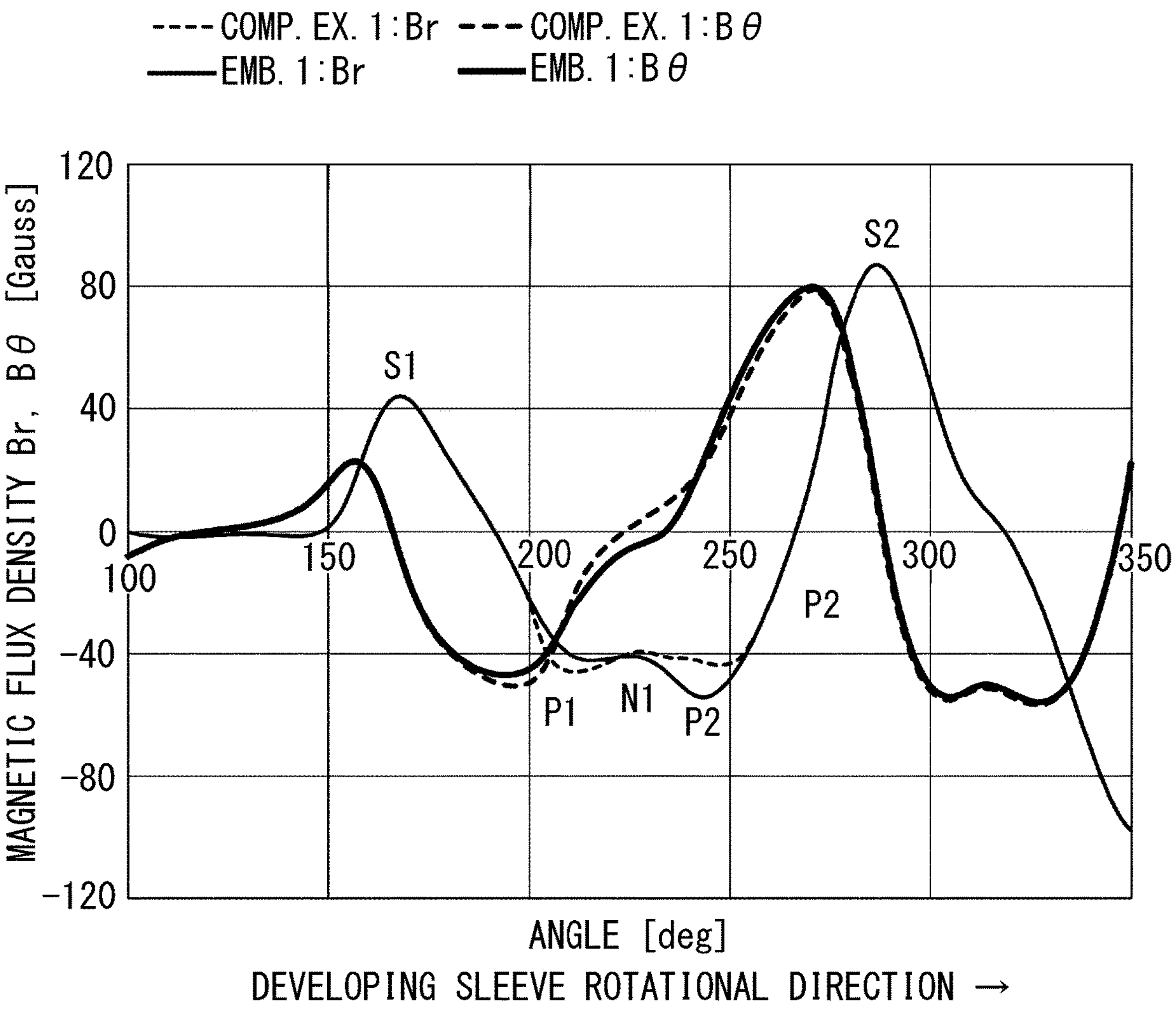
FIG. 3 is a graph showing a relationship between an angle with a regulating member arrangement region, as a center, of a developing sleeve, a magnetic flux density Br in a normal direction, and a magnetic flux density Bθ in a tangential direction, according to each of an embodiment 1 and a comparison example 1.

In the following, an embodiment 1 including the magnet roller 24*m* with the regulating magnetic pole N1 in this embodiment will be described with reference to FIG. 3 while being compared with a comparison example 1. FIG. 3 is a graph schematically showing distributions of the magnetic flux density Br in the normal direction and the magnetic flux density Bθ in the tangential direction on the developing sleeve 24 by the magnet roller 24*m*. Incidentally, the magnetic flux density Br accurately refers to a normal direction component of a magnetic flux density B relative to the developing sleeve. Hereinafter, the "magnetic flux density Br in the normal direction" is simply called the "magnetic flux density" in accordance with the custom in some cases. In the case where the magnetic flux density is simply called the magnetic flux density, the magnetic flux density refers to the "magnetic flux density Br in the normal direction". The magnetic flux density Br of each of the magnet rollers (with respect to the normal direction) in the embodiment 1 and in the comparison example 1 was measured using a magnetic field measuring device ("MS-9902", manufactured by F.W. BELL) in which a distance between a probe which is a member of the magnetic field measuring device and the surface of the developing sleeve 24 is of about 100 μm.

In FIG. 3, the magnetic flux density Bθ in the tangential direction relative to the outer peripheral surface of the developing sleeve 24 is also shown together. The magnetic flux density Bθ is acquired from the following formula 1 by using a value of the magnetic flux density Br in the normal direction measured by the above-described method.

$$B_\theta = -\frac{\partial A_Z(r,\theta)}{\partial_\gamma}\left(A_Z(R,\theta) = \int_0^\theta RB_\gamma d\theta\right) \quad \text{(formula 1)}$$

In FIG. 3, in addition to the regulating magnetic pole N1, the upstream-side scooping magnetic pole S1 and the downstream-side feeding magnetic pole S2 with respect to the rotational direction of the developing sleeve 24 are also shown together. In this case, as the magnet roller 24*m*, the magnet roller 24*m* in this embodiment (i.e., the magnet roller using the regulating magnetic pole N1 consisting of the two peaks) was used in the embodiment 1.

Further, although a magnetic flux density distribution is different from the magnetic flux density distribution in the embodiment 1, similarly as the embodiment 1, the magnet roller using the regulating magnetic pole N1 consisting of the two peaks was used in the comparison example 1. In the regulating magnetic pole N1 consisting of the two peaks, the magnetic flux density Br in the normal direction has a magnetic flux density distribution such that an upstream maximum value (upstream peak) P1, a minimum value B, and a downstream maximum value (downstream peak) P2 in a named order from the upstream side toward the downstream side with respect to the rotational direction of the developing sleeve 24.

In FIG. 3, the magnetic flux density Br (slid line) in the normal direction of the regulating magnetic pole N1 in this embodiment as the embodiment 1, and the magnetic flux density Br (broken line) in the normal direction in the comparison example 1 are shown. Further, in FIG. 3, the magnetic flux density Bθ in the tangential direction in each of the embodiment 1 and the comparison example 1 in the case where the rotational direction (downstream direction) of the developing sleeve 24 is taken as a positive direction were shown together by bold (thick) lines.

In both the embodiment 1 and the comparison example 1, a shape (distribution) of the magnetic flux density Br of the regulating magnetic pole is two peaks and such that the minimum value is present between two peaks P1 and P2 consisting of the upstream peak P1 which is the upstream-side maximum value (peak) and the downstream peak P2 which is the downstream-side maximum value (peak). That is, the shape of the magnetic flux density Br of the regulating magnetic pole N1 in the normal direction in each of the embodiment 1 and the comparison example 1 is the two peaks. By employing the magnetic flux density distribution such that the magnetic flux density Br of the regulating magnetic pole N1 in the normal direction has the two peaks, a region in which a change in magnetic flux density distribution with respect to the rotational direction of the developing sleeve 24 (θ direction change) is moderate can be further extended. For this reason, by disposing the regulating member 25 so as to oppose the position between the two peaks of the magnetic flux density Br of the regulating magnetic pole N1, compared with the case where the shape of the magnetic flux density Br is one peak, even when a positional relationship with the regulating member 25 is deviated, the magnetic flux density is not readily changed, and thus the developer amount is not readily fluctuated. That is, it becomes possible to enlarge latitude in pole position (positional relationship between the regulating magnetic pole N1 and the regulating member 25).

However, as described above, the developer amount of the developer regulated by the regulating member 25 is influenced not only by the magnetic flux density Br of the magnet roller 24*m* in the normal direction but also by the magnetic flux density Bθ of the magnet roller 24*m* in the tangential direction. As shown in FIG. 3, both in the embodiment 1 and the comparison example 1, the magnetic flux density Bθ in the tangential direction is negative on a side upstream of the regulating magnetic pole N1 and is positive on a side downstream of the regulating magnetic pole N1.

That is, in the regulating magnetic pole N1 as the first magnetic pole, between the position of the upstream peak P1 and the position of the downstream peak P2 with respect to the rotational direction of the developing sleeve 24, there is a position where the magnetic flux density B0—in the tangential direction relative to the outer peripheral surface of the developing sleeve 24 becomes 0 (zero) (requirement (B) described later). This is because a line of magnetic flux extends in a radial shape from the magnetic pole, and therefore, the line of magnetic flux extends in an upstream direction (negative direction) on a side upstream of the magnetic pole and extends in a downstream direction (positive direction) on a side downstream of the magnetic pole.

Figure 4:
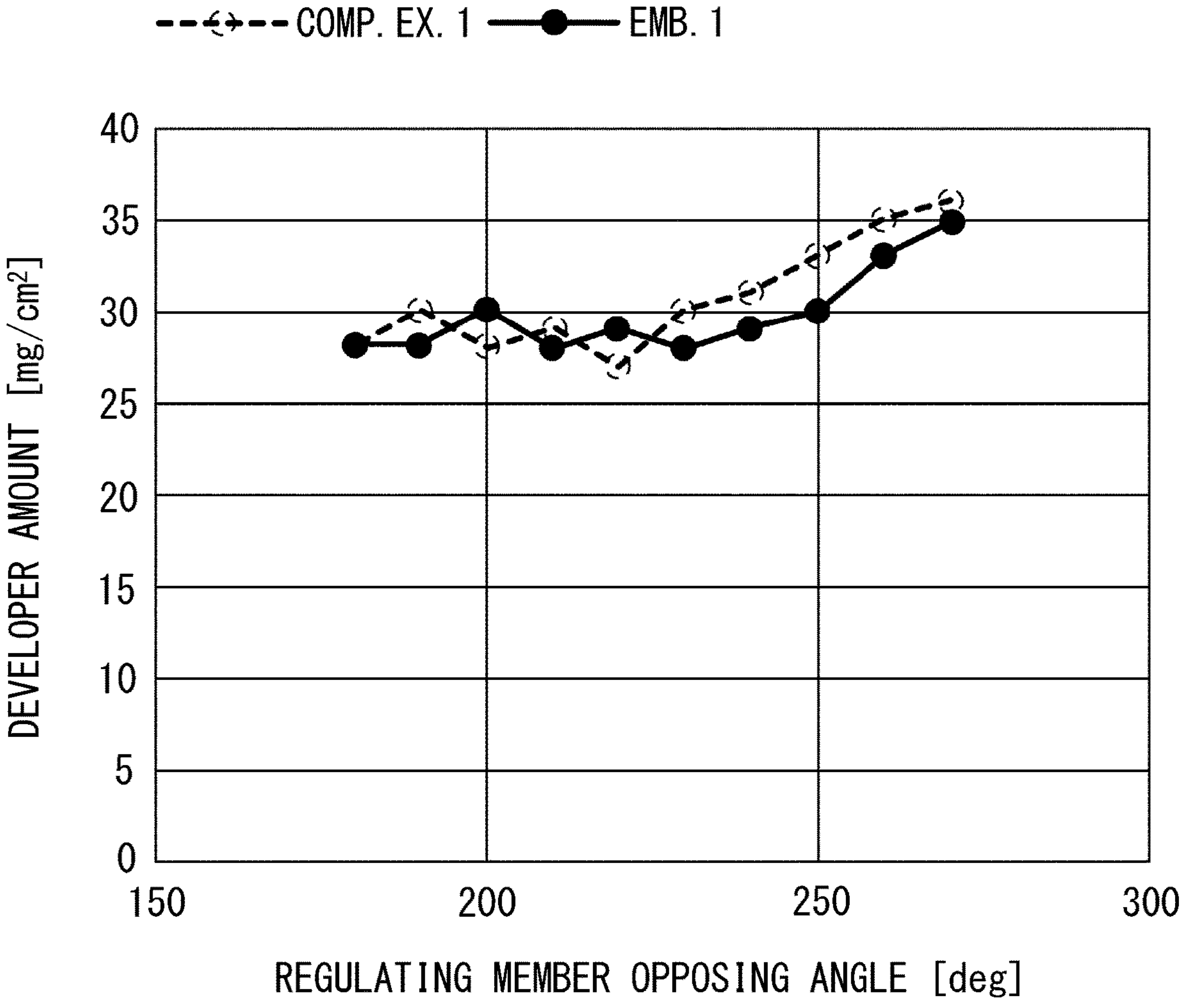
FIG. 4 is a graph showing a result of measurement of an amount of a developer on the developing sleeve after passing through a regulating member while changing an opposing position of the regulating member, for the developing sleeve according to each of the embodiment 1 and the comparison example 1.

FIG. 4 shows a result such that the developer amount of the developer on the developing sleeve 24 after passing through the regulating member is measured while changing an opposing position of the regulating member 25 with an increment of 10° for each of the magnet rollers in the embodiment 1 and in the comparison example 1. As a feature which is understood from FIG. 4 and which is common to the embodiment 1 and the comparison example 1, the following is understood. That is, in the case where the regulating member 25 opposes a region of a negative magnetic flux density Bθ in the tangential direction on a side upstream of the regulating magnetic pole N1 (at about 200°), a change in developer amount relative to the pole position is relatively small. On the other hand, in the case where the regulating member 25 opposes a region of a positive magnetic flux density Bθ in the tangential direction on a side downstream of the regulating magnetic pole N1 (at about 250°), the change in developer amount relative to the pole position is relatively large.

Such a difference in behavior would be considered due to a difference in behavior of the developer at a developer stagnation portion formed on the side upstream of the regulating member 25. This point will be described using FIGS. 5 and 6. Parts (a) and (b) of FIG. 5 show states of the developer in the neighborhood of a stagnant developer in the case where the regulating member 25 is disposed opposed to the region of the negative magnetic flux density Br of the regulating magnetic pole N1 in the tangential direction. In FIG. 5, part (a) schematically shows behavior of magnetic chains on the developing sleeve 24, and part (b) schematically shows, by a broken line, a boundary surface between a flowing layer in which the developer moves in the developer stagnation portion and an immobile layer in which the developer is substantially at rest. Similarly as in parts (a) and (b) of FIG. 5, parts (a) and (b) of FIG. 6 schematically show states of the developer in the neighborhood of a stagnant developer in the case where the regulating member 25 is disposed opposed to the region of the positive magnetic flux density Br of the regulating magnetic pole N1 in the tangential direction.

As shown in part (a) of FIG. 5, in the region of the negative magnetic flux density Br of the regulating magnetic pole N1 in the tangential direction, the line of magnetic flux extends in the upstream direction and therefore, the magnetic chains of the developer are formed in a state in which the magnetic chains are inclined in the upstream direction (i.e., a state in which the magnetic chains are inclined toward the upstream side as a portion thereof is closer to a free end thereof). The behavior of the magnetic chains having a shape inclined in the upstream direction is such that the magnetic chains are fed toward the downstream side and are gradually raised as the magnetic chains approaches the regulating member 25. Such a developer behavior is reflected, so that in the case where the regulating member 25 is disposed opposed to the region of the negative magnetic flux density Br of the regulating magnetic pole N1 in the tangential direction, as shown in part (b) of FIG. 5, a narrow region closer to the developing sleeve 24 than to the free end portion of the regulating member 25 constitutes the developer flowing layer.

On the other hand, as shown in part (a) of FIG. 6, in the region of the positive magnetic flux density Br of the regulating magnetic pole N1 in the tangential direction, the line of magnetic flux extends in the downstream direction and therefore, the magnetic chains of the developer are formed in a state in which the magnetic chains are somewhat inclined in the downstream direction (i.e., a state in which the magnetic chains are inclined toward the downstream side as a portion thereof is closer to a free end thereof). The behavior of the magnetic chains having a shape inclined in the downstream direction is such that the magnetic chains are more inclined as the magnetic chains are fed toward the downstream side. Such a developer behavior is reflected, so that in the case where the regulating member 25 is disposed opposed to the region of the positive magnetic flux density Br of the regulating magnetic pole N1 in the tangential direction, as shown in part (b) of FIG. 6, a wide region positioned on a side upstream of the regulating member 25 constitutes the developer flowing layer.

As one of factors of a fluctuation in developer amount after the regulation in the case where the positional relationship between the magnetic flux density distribution and the regulating member 25, a fluctuation in developer flowing layer would be considered. In the case where the regulating member 25 is disposed opposed to a position where the magnetic flux density Bθ in the tangential direction is negative, as shown in part (b) of FIG. 5, the developer flowing layer is originally narrow, so that the fluctuation in developer flowing layer in the case where the positional relationship with the regulating member 25 is deviated is liable to become small. On the other hand, in the case where the regulating member 25 is disposed opposed to a position where the magnetic flux density Bθ in the tangential direction is positive, as shown in part (b) of FIG. 6, the developer flowing layer is wide, so that the fluctuation in developer flowing layer in the case where the positional relationship with the regulating member 25 is deviated is liable to become large. For that reason, in the case where the magnetic flux density Bθ in the tangential direction at a position to which the regulating member 25 is disposed opposed is positive, the developer amount fluctuation when the positional relationship with the regulating member 25 is deviated is liable to become larger than in the case where the magnetic flux density Bθ in the tangential direction at the position is negative.

The behavior as shown in FIG. 4 such that the developer amount change relative to the pole position is relatively smaller in the case where the regulating member 25 is disposed opposed to the region (at about 200°) of the negative magnetic flux density Bθ of the regulating magnetic pole N1 in the tangential direction than in the case where the regulating member 25 is disposed opposed to the region (at about 250°) of the positive magnetic flux density Bθ of the regulating magnetic pole N1 in the tangential direction would be considered to be exhibited for the above-described reason.

For this reason, in order to suppress the developer amount fluctuation relative to the deviation of the positional relationship between the magnetic flux density distribution and the regulating member 25, it is preferable that not only the magnetic flux density Br of the regulating magnetic pole N1 in the normal direction is moderately changed but also the regulating member 25 is disposed opposed to the region of the negative magnetic flux density Bθ in the tangential direction.

Therefore, in this embodiment, the regulating member 25 is disposed opposed to not only the position between the two peaks P1 and P2 of the magnetic flux density Br of the regulating magnetic pole N1 in the normal direction but also the region of the region of the negative magnetic flux density Bθ of the regulating magnetic pole N1 in the tangential direction. In other words, the regulating member 25 is disposed opposed to a position between the upstream peak P1 of the magnetic flux density Br of the regulating magnetic pole N1 in the normal direction and a position O downstream of the upstream peak P1 and where the magnetic flux density Bθ of the regulating magnetic pole N1 in the tangential direction is zero (requirement (C) described later). By doing so, it becomes possible to suppress the developer amount change (after the regulation) relative to the pole position.

At this time, when an angle between the upstream peak P1 and the position O where the magnetic flux density Bθ in the tangential direction becomes 0 (zero) is narrow (small), a wide pole position latitude is not readily obtained. Accordingly, in this embodiment, the angle between the upstream peak P1 and the position O where the magnetic flux density Bθ in the tangential direction becomes 0 is increased.

Specifically, a constitution in which requirements (A) to (H) are satisfied is employed as follows. Incidentally, of these requirements, at least one of the requirements (D)' to (H) is satisfied.

(A) With respect to the rotational direction of the developing sleeve 24, an angle between the position of the upstream peak P1 and the position of the downstream peak P2 is 20° or more and 50° or less.

(B) In the first magnetic pole (regulating magnetic pole N1), with respect to the rotational direction of the developing sleeve 24, the position O where the magnetic flux density Bθ in the tangential direction relative to the outer peripheral surface of the developing sleeve 24 is disposed between the position of the upstream peak P1 and the position of the downstream peak P2.

(C) The regulating member 25 is disposed so as to oppose the position between the position of the upstream peak P1 and the position O where the magnetic flux density Bθ in the tangential direction is 0 (zero) with respect to the rotational direction of the developing sleeve 24.

(D) The position O where the magnetic flux density Bθ in the tangential direction is 0 is positioned within a range of ±2° relative to a midpoint between the position of the upstream peak P1 and the position of the downstream peak P2 with respect to the rotational direction of the developing sleeve 24 or is positioned on a side downstream of this range.

(D)' The position O where the magnetic flux density Bθ in the tangential direction is 0 is positioned on a side downstream of the midpoint between the position of the upstream peak P1 and the position of the downstream peak P2 with respect to the rotational direction of the developing sleeve 24.

(E) With respect to the rotational direction of the developing sleeve 24, an angle from the position of the upstream peak P1 to the position O where the magnetic flux density Bθ in the tangential direction is 0 is 15° or more and less than 50°.

(F) An absolute value |Br| of the upstream peak P1 is smaller than an absolute value |Br| of the downstream peak P2.

(G) A difference between the absolute value |Vr| of the upstream peak P1 and an absolute value |Br| of the magnetic flux density in the normal direction at the position O where the magnetic flux density Bθ in the tangential direction is 0 is 10 mT or less.

(H) With respect to the rotational direction of the developing sleeve 24, an absolute value |Br| of the magnetic flux density Br of the upstream-side magnetic pole (scooping magnetic pole S1) in the normal direction is smaller than an absolute value |Br| of the magnetic flux density Br of the downstream-side magnetic pole (feeding magnetic pole S2) in the normal direction.

The above-described respective requirements will be specifically described. Incidentally, the requirement (B) was described above. First, for explanation of the comparison example 1, in FIG. 7, the magnetic flux density Br in the normal direction and the magnetic flux density Bθ in the tangential direction in the comparison example 1 were shown together. In FIG. 7, a midpoint M between the upstream peak P1 and the downstream peak P2 of the magnetic flux density Br, in the normal direction, of the regulating magnetic pole N1 of the magnet roller in the comparison example 1 was also shown. From FIG. 7, it is understood that the position O where the magnetic flux density Bθ, in the tangential direction of the regulating magnetic pole N1 of the magnet roller in the comparison example 1 is 0 is positioned upstream of the midpoint M. For that reason, an angle between the upstream peak P1 of the magnetic flux density Br in the normal direction and the position O where the magnetic flux density Bθ in the tangential direction is 0 is 12° which is narrow (small).

From this fact, although the magnet roller in the comparison example 1 has the shape such that the magnetic flux density Br in the normal direction has the two peaks, it is expected that an assumed wide pole position latitude cannot be obtained. In actuality, when FIG. 4 is checked, in the comparison example 1, a region in which the developer amount fluctuation relative to the abscissa is moderate is relatively narrow. For that reason, latitude in developer amount fluctuation when the positional relationship with the regulating member 25 is deviated is relatively narrow. Therefore, in the embodiment 1, a position O where the magnetic flux density Bθ in the tangential direction is 0 is positioned on a side downstream of the position O in the comparison example 1.

[Position O where Magnetic Flux Density Bθ in Tangential Direction is 0 (Requirements (D), (D)']

For explanation of the embodiment 1, in FIG. 8, the magnetic flux density Br in the normal direction and the magnetic flux density Bθ in the tangential direction in the embodiment 1 were shown together. In FIG. 8, the midpoint M between the upstream peak P1 and the downstream peak P2 of the magnetic flux density Br, in the normal direction, of the regulating magnetic pole N1 of the magnet roller 24*m* in the embodiment 1 was also shown together. From FIG. 8, different from the comparison example 1, it is understood that the position O where the magnetic flux density Bθ, in the tangential direction, of the regulating magnetic pole N1 of the magnet roller 24*m* in the embodiment 1 is positioned downstream of the midpoint M. For that reason, an angle between the upstream peak P1 of the magnetic flux density Br in the normal direction and the position O where the magnetic flux density Bθ in the tangential direction is 0 is larger than the associated angle in the comparison example 1.

From this fact, it is expected that the magnet roller 24*m* in the embodiment 1 is capable of providing the pole position latitude wider than the pole position latitude in the comparison example 1. In actuality, when FIG. 4 is checked, in the embodiment 1, the region in which the developer amount fluctuation relative to the abscissa is moderate is wider than the associated region in the comparison example 1. For that reason, in the embodiment 1, a constitution in which the latitude in developer amount fluctuation when the positional relationship with the regulating member 25 is deviated is wide can be achieved.

From the above, it would be considered whether the position O where the magnetic flux density Bθ, in the tangential direction, of the regulating magnetic pole N1 of the magnet roller 24*m* is 0 is positioned upstream or downstream of the midpoint between the upstream peak P1 and the downstream peak P2 of the magnetic flux density Br in the normal direction constitutes an index of the pole position latitude. In FIGS. 7 and 8, values of the angles and the magnetic flux density Br in the normal direction at principal positions in the comparison example 1 and in the embodiment 1, respectively.

As shown in FIG. 17, the position O where the magnetic flux density Bθ, in the tangential direction, of the regulating magnetic pole N1 of the magnet roller 24*m* in the comparison example 1 is 0 is positioned upstream of the midpoint M between the upstream peak P1 and the downstream peak P2 of the magnetic flux density Br in the normal direction by 5°. On the other hand, as shown in FIG. 8, the position O where the magnetic flux density B, in the tangential direction, of the regulating magnetic pole N1 of the magnet roller 24*m* in the embodiment 1 is 0 is positioned downstream of the midpoint M between the upstream peak P1 and the downstream peak P2 of the magnetic flux density Br in the normal direction by 3°.

In order to sufficiently obtain an effect of increasing the pole position latitude by the two-peak shape of the magnetic flux density Br of the regulating magnetic pole N1 in the normal direction, the position O where the magnetic flux density Bθ, in the tangential direction, of the regulating magnetic pole N1 of the magnet roller 24*m* may desirably be positioned in the neighborhood (within a range of ±2°) of the midpoint M between the upstream peak P1 and the downstream peak P2 of the magnetic flux density Br in the normal direction or be positioned downstream of the midpoint M (requirement (D)). More preferably, the position O is positioned downstream of the midpoint M (requirement (D)'). By employing such a constitution, it becomes possible to sufficiently obtain the effect of increasing the pole position latitude by the two-peak shape of the magnetic flux density Br of the regulating magnetic pole N1 in the normal direction.

[Two-Peak Shape]

The magnet roller 24*m* which is an object of this embodiment is such that the magnetic flux density distribution of the regulating magnetic pole N1 in the normal direction has the two-peak shape, and by employing the two-peak shape, even when the positional relationship with the regulating member 25 is deviated, the magnetic flux density Br in the normal direction is not readily changed and thus the developer amount can be made hard to fluctuate, so that the pole position latitude can be made wide. Here, "the two-peak shape of the magnetic flux density distribution of the regulating magnetic pole N1 in the normal direction" refers to, as shown in FIGS. 7 and 8, a shape such that the magnetic flux density Br of the regulating magnetic pole N1 in the normal direction has the two peaks P1 and P2 and that a recessed-shaped minimum value B is present between the two peaks P1 and P2 (in this case, the maximum value and the minimum value refer to those in terms of an absolute value). At this time, the maximum value and the minimum value which are accompanied by a measuring noise of 0.5 mT or less are disregarded.

[Difference in Magnetic Flux Density Br Between Upstream Peak P1 and Position O]

Here, the minimum value B is excessively small relative to the two peaks P1 and P2, the magnetic flux density Br in the normal direction fluctuates and thus can cause the developer amount fluctuation. As described above, in this embodiment, the regulating member 25 is disposed in the region between the upstream peak P1 of the magnetic flux density Br in the normal direction and the position O downstream of the upstream peak P1 and where the magnetic flux density Bθ in the tangential direction is 0 (requirement (C)). For that reason, the difference between the maximum value and the minimum value B of the upstream peak P1 of the magnetic flux density Br in the normal direction may preferably be 10 mT or less.

Further, there is also a possibility that a value of the magnetic flux density Br in the normal direction at the position O where the magnetic flux density Bθ in the tangential direction is 0 is larger than the magnetic flux density Br of the upstream peak P1 in the normal direction. Accordingly, a fluctuation in magnetic flux density Br in the normal direction between the upstream peak P1 and the position O where the magnetic flux density Bθ in the tangential direction is 0 may preferably fall within 10 mT or less (requirement (G)). In the embodiment 1, the difference between the maximum value and the minimum value of the upstream peak P1 of the magnetic flux density Br in the normal direction is 2 mT.

Further, the value of the magnetic flux density Br in the normal direction at the position O where the magnetic flux density Bθ in the tangential direction is 0 is 45 mT, and the fluctuation in magnetic flux density Br in the normal direction at the position between the upstream peak P1 and the position O where the magnetic flux density Bθ in the tangential direction is 0 is 5 mT. Therefore, the embodiment 1 satisfies the above-described condition.

[Two-Peak Interval Requirement (A)]

As regards an interval between the two peaks P1 and P2, the pole position latitude can be made wider by increasing the interval. For that reason, when the angle between the peaks P1 and P2 is at least 20° (requirement (A)), preferably 25° or more, more preferably 30° or more, a sufficient pole position latitude can be obtained. However, when the angle is 50° or more, the interval is excessively wide, so that there is a possibility that the interval has the influence on a degree of freedom of arrangement of other magnetic poles. Accordingly, the interval (angle) between the peaks P1 and P2 may preferably be less than 50°. Particularly, in the case where the magnet roller 24*m* includes magnetic poles of 7 or more poles as in this embodiment, the influence is more liable to arise. In the embodiment 1, the angle (interval) is 30°, so that the embodiment 1 satisfies the above-described condition.

[Angle from Upstream Peak P1 to Position O (Requirement (Embodiment))]

In the case of this embodiment, it is more important that an interval between the upstream peak P1 of the magnetic flux density Br in the normal direction and the position O where the magnetic flux density Bθ in the tangential direction is 0 is made large. The angle between the upstream peak P1 and the position O is 12° in the comparison example 1, and is 18° in the embodiment 1. This angle may preferably be 15° or more in order to obtain a sufficient pole position latitude (requirement (E)). However, when the angle between the upstream peak P1 of the magnetic flux density Br in the normal direction and the position O where the magnetic flux density Bθ in the tangential direction is 0 is made 50° or more, the angle is excessively large, so that there is a possibility that the large angle has the influence on the degree of freedom of arrangement of other magnetic poles. Accordingly, the angle between the upstream peak P1 and the position O may preferably be less than 50°. Particularly, in the case where the magnet roller 24*m* includes the magnetic poles of 7 or more poles, the influence is more liable to arise.

As described above, as regards the regulating magnetic pole N1 of the magnet roller 24*m* in the embodiment 1, the region in which the magnetic flux density Bθ in the tangential direction in which the developer amount fluctuation is relatively small is larger than 0 (Bθ>0) is capable of being achieved in an angle range of 15° or more between the two peaks of the magnetic flux density Br in the normal direction. Further, within this range, the magnetic flux density Br in the normal direction is 10 mT or less. Further, the regulating member 25 is disposed in the region, so that it becomes possible to obtain a wide pole position latitude.

[Magnetic Flux Density of Two Peaks (Requirement (F))]

Here, the reason why the position O where the magnetic flux density Bθ, in the tangential direction, of the regulating magnetic pole N1 of the magnet roller 24*m* in the embodiment 1 was able to be disposed on a more downstream side will be described. The position O where the magnetic flux density Bθ in the tangential direction is 0 means a state in which the line of magnetic flux extends only in the normal direction (infinity direction). In general, the line of magnetic flux extending from the magnetic pole extends in a radial shape toward upstream and downstream magnetic poles, but is not readily affected relatively by the upstream and downstream magnetic poles, so that the line of magnetic flux is liable to extend in the normal direction (infinity direction).

According to FIG. 7, as regards the regulating magnetic pole N1 of the magnetic pole 24*m* in the comparison example 1, the magnetic flux density Br in the normal direction has an upstream peak P1 value of 46 mT and a downstream peak P2 value of 43 mT, so that the upstream peak P1 is larger in absolute value than the downstream peak P2. For this reason, it would be considered that the position where the line of magnetic flux extends in the normal direction, i.e., the position O where the magnetic flux density Bθ in the tangential direction is 0 is liable to shift in a direction of the upstream peak P1 which is the value larger in magnetic flux density Br. In actuality, the position O where the magnetic flux density Bθ, in the tangential direction, of the regulating magnetic pole N1 of the magnet roller 24*m* in the comparison example 1 is 0 is positioned upstream of the midpoint M between the upstream peak P1 and the downstream peak P2 of the magnetic flux density Br in the normal direction by 5°.

On the other hand, according to FIG. 8, as regards the regulating magnetic pole N1 of the magnetic pole 24*m* in the embodiment 1, the magnetic flux density Br in the normal direction has an upstream peak P1 value of 42 mT and a downstream peak P2 value of 45 mT, so that the downstream peak P2 is larger in absolute value than the downstream peak P1. For this reason, it would be considered that the position where the line of magnetic flux extends in the normal direction, i.e., the position O where the magnetic flux density Bθ in the tangential direction is 0 is liable to shift in a direction of the downstream peak P2 which is the value larger in magnetic flux density Br. Accordingly, an absolute value |Br| of the magnetic flux density of the upstream peak P1 in the normal direction may preferably be made smaller than an absolute value |Br| of the magnetic flux density of the downstream peak P2 in the normal direction (requirement (F)). In actuality, the position O where the magnetic flux density Bθ, in the tangential direction, of the regulating magnetic pole N1 of the magnet roller 24*m* in the embodiment 1 is 0 is positioned downstream of the midpoint M between the upstream peak P1 and the downstream peak P2 of the magnetic flux density Br in the normal direction by 3° .

Thus, as regards the magnetic flux density Br in the normal direction, the absolute value |Br| of the magnetic flux density of the downstream peak P2 in the normal direction is made larger than the absolute value |Br| of the magnetic flux density of the upstream peak P1 in the normal direction, so that the position where the line of magnetic flux extends in the normal direction can be disposed on a more downstream side.

Preferably, the magnetic flux density absolute value |Br| of the downstream peak P2 is made larger than the magnetic flux density absolute value |Br| of the upstream peak P1 by 2 mT or more. This is because of preventing reverse in magnitude relationship between the magnetic flux density absolute value |Br| of the upstream peak P1 and the magnetic flux density absolute value |Br| of the downstream peak P2 caused depending on a part tolerance of the magnet roller. In order to achieve a further effect, the magnetic flux density absolute value |Br| of the downstream peak P2 may preferably be made larger than the magnetic flux density absolute value |Br| of the upstream peak P1 by 5 mT or more, more preferably by 10 mT or more.

On the other hand, when the magnetic flux density absolute value |Br| of the downstream peak P2 is larger than the magnetic flux density absolute value |Br| of the upstream peak P1 by 25 mT or more, a fluctuation range of the magnetic flux density Br between the two peaks P1 and P2 becomes large, so that there is a liability that the large fluctuation range has the influence on the pole position latitude. For this reason, the fluctuation range (difference) between the magnetic flux density absolute values |Br| of the upstream peak P1 and the downstream peak P2 may preferably be made 25 mT or less. That is, the difference between the magnetic flux density absolute value |Br| of the upstream peak P1 and the magnetic flux density absolute value |Br| of the downstream peak P2 may preferably be made 2 mT or more and 25 mT or less. At this time, as described above, the fluctuation in magnetic flux density Br in the normal direction at the position between the upstream peak P1 and the position O where the magnetic flux density Bθ in the tangential direction is 0 may preferably be 10 mT or less.

[Relationship Between Regulating Magnetic Pole and Adjacent Magnetic Pole (Requirement (H))]

Here, the position in which the line of magnetic flux of the regulating magnetic pole N1 extends in the normal direction is largely affected also by a magnetic pole adjacent to the regulating magnetic pole N1. This is because the line of magnetic flux readily extends in a magnetic flux density direction when the magnetic flux density of the adjacent magnetic pole is large, whereas it does not readily extend in the magnetic flux density direction when the magnetic flux density of the adjacent magnetic pole is small, i.e., the line of magnetic flux readily extends in the normal direction. From the above, it would be considered that the position in which the line of magnetic flux of the regulating magnetic pole N1 extends in the normal direction readily shifts in a direction in which there is a magnetic pole smaller in absolute value Br of the magnetic flux density in the normal direction when maximum values of the magnetic flux density Br in the normal direction are compared with each other between an upstream magnetic pole and a downstream magnetic pole which are adjacent to the regulating magnetic pole N1.

According to FIG. 7, as regards the magnet roller 24*m* in the comparison example 1, an absolute value |Br| of a maximum value of the magnetic flux density Br in the normal direction of the scooping magnetic pole S1 positioned upstream of the regulating magnetic pole N1 is 44 mT. On the other hand, an absolute value |Br| of a maximum value of the magnetic flux density Br in the normal direction of the feeding magnetic pole S2 positioned downstream of the regulating magnetic pole N1 is 88 mT. For this reason, the absolute value |Br| of the maximum value of the magnetic flux density Br in the normal direction of the scooping magnetic pole S1 is smaller than the absolute value |Br| of the maximum value of the magnetic flux density Br in the normal direction of the feeding magnetic pole S2. In other words, the feeding magnetic pole S2 is larger in absolute value |Br| of the magnetic flux density Br in the normal direction than the scooping magnetic pole S1. For that reason, the position where the line of magnetic flux of the regulating magnetic pole N1 in the comparison example 1 extends in the normal direction is liable to shift in an upstream direction in which the scooping magnetic pole S1 smaller in absolute value |Br| of the magnetic flux density in the normal direction exists.

In actuality, in the comparison example 1, although there is no large difference between the two peak values of the magnetic flux density Br of the regulating magnetic pole N1 in the normal direction, the position O where the magnetic flux density Bθ in the tangential direction is 0 shifts relatively largely toward the upstream side, and this would be considered due to the above-described reason.

As shown in FIG. 8, also as regards the magnet roller 24*m* in the embodiment 1, similarly as in the case of the comparison example 1, an absolute value |Br| of a maximum value of the magnetic flux density Br in the normal direction of the scooping magnetic pole S1 positioned upstream of the regulating magnetic pole N1 is 44 mT. On the other hand, an absolute value |Br| of a maximum value of the magnetic flux density Br in the normal direction of the feeding magnetic pole S2 positioned downstream of the regulating magnetic pole N1 is 88 mT. For this reason, the absolute value |Br| of the maximum value of the magnetic flux density Br in the normal direction of the scooping magnetic pole S1 is smaller than the absolute value |Br| of the maximum value of the magnetic flux density Br in the normal direction of the feeding magnetic pole S2 (requirement (H)). In other words, the feeding magnetic pole S2 is larger in absolute value |Br| of the magnetic flux density Br in the normal direction than the scooping magnetic pole S1. For that reason, the position where the line of magnetic flux of the regulating magnetic pole N1 in the embodiment 1 extends in the normal direction can be said that the position is liable to shift in an upstream direction in which the scooping magnetic pole S1 smaller in absolute value |Br| of the magnetic flux density in the normal direction exists.

Although such a constitution is employed, as regards the magnet roller 24*m* in the embodiment 1, for the magnetic flux density Br in the normal direction, the absolute value |Br| of the magnetic flux density of the downstream peak P2 in the normal direction is made larger than the absolute value |Br| of the magnetic flux density of the upstream peak P1 in the normal direction (requirement (F)), so that the position O where the magnetic flux density Bθ in the tangential direction is 0 was able to be shifted toward the downstream side. That is, as in this embodiment, in the case where the downstream-side magnetic pole (the feeding magnetic pole S2 in this embodiment) is larger in absolute value |Br| of the maximum value of the magnetic flux density Br in the normal direction than the upstream-side magnetic pole (the scooping magnetic pole S1 in this embodiment) (requirement (H)), the magnetic flux density absolute value |Br| of the downstream peak P2 is made larger than the magnetic flux density absolute value |Br| of the upstream peak P1 (requirement (F)), so that the position where the line of magnetic flux of the regulating magnetic pole N1 extends in the normal direction can be shifted toward the downstream side. In this case, in order to achieve an effect, the magnetic flux density absolute value |Br| of the downstream peak P2 of the regulating magnetic pole N1 may preferably be made larger than the magnetic flux density absolute value |Br| of the upstream peak P1 of the regulating magnetic pole N1 by 5 mT or more, more preferably be 10 mT or more.

Incidentally, the magnetic pole S2 disposed downstream of the regulating magnetic pole N1 is the developing magnetic pole in many cases, but may preferably be the feeding magnetic pole as in this embodiment. This is because the developing magnetic pole is an important magnetic pole for determining an image in a developing step and therefore a degree of freedom of a change is low, whereas the feeding magnetic pole is relatively high in degree of freedom of the change. As already described above, the magnet roller 24*m* in this embodiment includes the seven magnetic poles. For that reason, the magnetic pole disposed downstream of the regulating magnetic pole N1 can be easily made the feeding magnetic pole S2. However, even when the magnetic pole disposed downstream of the regulating magnetic pole N1 is the developing magnetic pole, this embodiment is applicable to the developing magnetic pole.

[Arrangement of Regulating Member (Requirement (C))]

As regards an arrangement position of the regulating member 25, it has already been described that even when the position of the regulating member 25 is deviated, the fluctuation in developer amount can be suppressed by disposing the regulating member 25 at the position between the upstream peak P1 of the magnetic flux density Br of the regulating magnetic pole N1 of the magnet roller 24*m* and the position O downstream of the upstream peak P1 and where the magnetic flux density Bθ in the tangential direction is 0. That is, with respect to the rotational direction of the developing sleeve 24, the regulating member 25 is disposed so as to oppose the position between the upstream peak P1 and the position O where the magnetic flux density Bθ in the tangential direction is 0 (requirement (C)).

In FIG. 8, the arrangement position of the regulating member 25 in the embodiment 1 was illustrated. In the embodiment 1, the regulating member 25 was disposed substantially at a midpoint (224°) between the upstream peak P1 (215°) of the magnetic flux density Br of the regulating magnetic pole N1 and the position O (233°) downstream of the upstream peak P1 and where the magnetic flux density Bθ in the tangential direction is 0.

Here, a line connecting an upstream end position of the fee end (regulating portion) of the regulating member 25 opposing the developing sleeve 24 with a center of the developing sleeve 24 is called the arrangement position of the regulating member 25. The reason why the upstream end is employed is that the developer amount is actually regulated on the upstream side by the regulating member 25 and the arrangement of the upstream end of the regulating member 25 is important.

There is a case that a cross-sectional shape of the regulating member 25 is not a rectangular shape. Basically, a free end position of the regulating member 25 opposing the developing sleeve 24 is referred to as an opposing position, and in the case where there are a plurality of free ends of the regulating member 25 with respect to the rotational direction of the developing sleeve 24, a position of the most-upstream-side free end is referred to as the opposing position. For example, in the case where the cross-sectional shape of the regulating member 25 is a circular shape, a closest position of the regulating member 25 to the developing sleeve 24 is referred to as the opposing position.

A relationship between the arrangement position and the magnetic flux density distribution can be measured in the following manner. In general, the magnet roller 24*m* of the developing sleeve 24 is provided with a shaft, of which end portion has a so-called D-cut shape, and a D-cut portion is fixed to the developing device 20 by a pole determining member so as to realize a desired magnetic pole arrangement. A distribution of the magnetic flux density for relative to (planed angle of) the D-cut portion of the magnet roller 24*m* is capable of being measured by the above-described magnetic field measuring device. On the other hand, when the arrangement position of the regulating member 25 relative to an axial center of the magnet roller 24*m* is measured, it is possible to know a relationship between the arrangement position of the regulating member 25 and the magnetic flux density distribution. The arrangement position of the regulating member 25 relative to the axial center of the magnet roller 24*m* may be measured with use of measuring equipment such as a protractor or the like, but in the case where the arrangement position is intended to be accurately determined, a general-purpose three-dimensional measuring machine (for example, "CRYSTA-Apex S series", manufactured by Mitutoyo Corp.) may be used.

In the case of this embodiment, by employing the above-described constitution, in a magnetic flux density distribution in which the regulating magnetic pole N1 disposed closest to the regulating member 25 has the two maximum values (peaks), the fluctuation in developer amount regulated by the regulating member 25 can be suppressed. That is, in the case where the above-descried requirements (A) to (D) are satisfied, even when the magnetic flux density distribution of the regulating magnetic pole N1 has the two-peak shape, it is possible to suppress the fluctuation in developer amount regulated by the regulating member 25. Further, at least either one of the requirements (D)' to (H) is added, the fluctuation in developer amount regulated by the regulating member 25 can be preferably suppressed. However, in the case where the requirement (H) is satisfied, it is preferable that the requirement (F) is satisfied. Or, also by satisfying the requirements (A), (B), (C), (F) and (H), it is possible to suppress the fluctuation in developer amount regulated by the regulating member 25.

Second Embodiment

A second embodiment will be described using FIG. 9 while making reference to FIG. 2. In the first embodiment, the requirements (A) to (D) are satisfied. On the other hand, in this embodiment, in addition to the requirements (A) to (C), a requirement (I) described later is satisfied. Other constitutions and actions are similar to those in the above-described first embodiment, and therefore, the similar constitutions are emitted from description and illustration or briefly described by adding the same reference numerals or symbols. In the following, a difference from the first embodiment will be principally described.

In the case of this embodiment, of the above-described requirements (A) to (H), at least the requirements (A) to (C) are satisfied. In addition to these, the following requirement (I) is satisfied. Further, it is preferable that the following requirement (J) and the above-described requirements (F) and (H) are satisfied.

(I) The absolute value |Br| of the maximum value of the magnetic flux density of the upstream-side magnetic pole (scooping magnetic pole S1) in the normal direction is larger than the absolute value |Br| of the upstream peak P1.

(J) A difference between the absolute value |Br| of the maximum value of the magnetic flux density of the upstream-side magnetic pole (scooping magnetic pole S1) in the normal direction and the absolute value |Br| of the upstream peak P1 is 5 mT or more.

An embodiment 2 and an embodiment 2' for the regulating magnetic pole N1 in this embodiment will be described while being compared with the comparison example 1 (described in the embodiment 1) as shown in FIG. 9. Outlines of image forming apparatuses 1 and developing devices 20 in the embodiment 2 and the embodiment 2' are similar to the outline in the embodiment 1, and therefore will be omitted from detailed description.

In FIG. 9, a magnetic flux density Br (solid line) in the normal direction in the embodiment 2 for the regulating magnetic pole N1 in this embodiment, a magnetic flux density for (dotted line) in the normal direction in the embodiment 2' for the regulating magnetic pole N1 in this embodiment, and the magnetic flux density Br (broken line) in the normal direction in the comparison example 1 are shown. Further, in FIG. 9, magnetic flux densities Bθ in the tangential direction for the embodiment 2, the embodiment 2', and the comparison example 1 are also represented together by a bold solid line, a bold dotted line, and a bold broken line, respectively, in the case where a downstream-side of the rotational direction of the developing sleeve 24 is taken as a positive side.

First, the embodiment 2 satisfies the above-described requirements (A), (B), (C) and (I) and may preferably further satisfy the requirement (J). As shown in FIG. 9, the embodiment 2 is different from the comparison example 1 in that the distribution of the magnetic flux density Br, in the normal direction, of the scooping magnetic pole S1 disposed upstream of the regulating magnetic pole N1 is different from the associated distribution in the comparison example 1.

Specifically, compared with the comparison example 1, in the embodiment 2, the maximum value of the scooping magnetic pole S1 is large. A maximum value of the magnetic flux density Br, in the normal direction, of the scooping magnetic pole S1 in the embodiment 2 is 59 mT. That is, the absolute value |Br| of the maximum value of the magnetic flux density of the scooping magnetic pole S1 in the normal direction is larger than the absolute value |Br| of the magnetic flux density of the upstream peak P1 (requirement (I)).

When the magnetic flux density Bθ in the tangential direction in the comparison example 1 and the magnetic flux density Bθ in the tangential direction in the embodiment 2 are compared with each other, it is understood that the position (where the line of magnetic flux extends in the normal direction) where the magnetic flux density Bθ in the tangential direction is 0 is shifted in the downstream direction, in the embodiment 2, between the two peaks P1 and P2 of the magnetic flux density Br of the regulating magnetic pole N1 in the normal direction. A consideration result of a mechanism thereof will be described below.

As described in the first embodiment, the position where the line of magnetic flux of the regulating magnetic pole N1 extends in the normal direction is largely influenced also by the relationship between the regulating magnetic pole N1 and the magnetic pole adjacent to the regulating magnetic pole N1. As regards the magnet roller 24*m* in the comparison example 1, the maximum value of the upstream peak P1 of the magnetic flux density Br of the regulating magnetic pole N1 in the normal direction is 46 mT, and on the other hand, the maximum value of the magnetic flux density Br, in the normal direction, of the scooping magnetic pole S1 disposed upstream of and adjacent to the regulating magnetic pole N1 is 44 mT, so that the maximum value of the upstream peak P1 of the regulating magnetic pole N1 is larger than the maximum value of the scooping magnetic pole S1. Accordingly, the line of magnetic flux in the neighborhood of the upstream peak P1 of the regulating magnetic pole N1 does not extend relatively in the upstream scooping magnetic pole S1 direction and rather readily extends in the normal direction. As a result, it would be considered that the position where the line of magnetic flux of the regulating magnetic pole N1 extends in the normal direction readily shifts toward the upstream side where the upstream peak P1 appears.

On the other hand, as regards the magnet roller 24*m* in the embodiment 2, the maximum value of the upstream peak P1 of the magnetic flux density Br of the regulating magnetic pole N1 in the normal direction is 46 mT, and on the other hand, the maximum value of the magnetic flux density Br, in the normal direction, of the scooping magnetic pole S1 disposed upstream of and adjacent to the regulating magnetic pole N1 is 59 mT, so that the maximum value of the upstream peak P1 of the regulating magnetic pole N1 is smaller than the maximum value of the scooping magnetic pole S1. Accordingly, the line of magnetic flux in the neighborhood of the upstream peak P1 of the regulating magnetic pole N1 readily extends relatively in the upstream scooping magnetic pole S1 direction and rather does not readily extend in the normal direction. As a result, it would be considered that the position where the line of magnetic flux of the regulating magnetic pole N1 extends in the normal direction readily shifts toward the downstream side where the downstream peak P2 appears.

When the position where the line of magnetic flux of the regulating magnetic pole N1 extends in the normal direction, i.e., the position where the magnetic flux density Bθ in the tangential direction is 0 shifts toward the downstream side, the region of the negative magnetic flux density Bθ in the tangential direction in which the developer amount change is small can be increased, so that it becomes possible to extend the pole position latitude.

From the above, the maximum value of the magnetic flux density Br, in the normal direction, of the scooping magnetic pole S1 disposed upstream of and adjacent to the regulating magnetic pole N1 is made larger than the maximum value of the upstream peak P1 of the magnetic flux density Br of the regulating magnetic pole N1 in the normal direction, so that the region in which the developer amount change is small and in which the magnetic flux density Bθ in the tangential direction is negative can be increased, and by disposing the regulating member 25 in this region, the pole position latitude can be extended.

When the maximum value of the magnetic flux density Br, in the normal direction, of the scooping magnetic pole S1 disposed upstream of and adjacent to the regulating magnetic pole N1 is made larger than the maximum value of the upstream peak P1 of the magnetic flux density Br of the regulating magnetic pole N1 in the normal direction, a somewhat effect can be obtained, but in order to obtain a sufficient effect, the former maximum value may preferably be made larger by 5 mT or more, more preferably be made larger by 10 mT or more for obtaining a further effect. That is, the difference between the absolute value |Br| of the magnetic flux density of the scooping magnetic pole S1 in the normal direction and the absolute value |Br| of the magnetic flux density of the upstream peak P1 in the normal direction may preferably be 5 mT or more (requirement (J)), and further preferably be 10 mT or more. In the embodiment 2, this difference is 13 mT. By this, in the embodiment 2, compared with the comparison example 1, the region in which the developer amount change is small and in which the magnetic flux density Bθ in the tangential direction is negative can be increased, and by disposing the regulating member 25 in the region, the pole position latitude was able to be extended.

When the maximum value of the magnetic flux density Br, in the normal direction, of the scooping magnetic pole S1 disposed upstream of and adjacent to the regulating magnetic pole N1 is made excessively larger than the maximum value of the upstream peak P1 of the magnetic flux density Br of the regulating magnetic pole N1 in the normal direction, there is a liability that the change in Bθ becomes large, and therefore, it is preferable that the above-described difference is suppressed to a range of 50 mT or less. That is, the difference between the absolute value |Br| of the magnetic flux density of the scooping magnetic pole S1 in the normal direction and the absolute value |Br| of the magnetic flux density of the upstream peak P1 in the normal direction may preferably be made 50 mT or less.

Incidentally, in the embodiment 2, similarly as in the comparison example 1, for the magnetic flux density Br of the regulating magnetic pole N1 in the normal direction, the maximum value (43 mT) of the value downstream peak P2 was smaller than the maximum value (46 mT) of the upstream peak P1. That is, the embodiment 2 does not satisfy the requirement (F).

Next, the embodiment 2' satisfies the requirement (F) in addition to the above-described requirements (A), (B), (C) and (I). Incidentally, in addition thereto, the embodiment 2' may preferably further satisfy the requirement (J). In such an embodiment 2', similarly as in the embodiment 2, the maximum value of the magnetic flux density Br, in the normal direction, of the scooping magnetic pole S1 disposed upstream of and adjacent to the regulating magnetic pole N1 is made larger than the maximum value of the upstream peak P1 of the magnetic flux density Br of the regulating magnetic pole N1 in the normal direction (requirement (I)). At the same time, as the embodiment 1, for the magnetic flux density Br of the regulating magnetic pole N1 in the normal direction, the maximum value of the downstream peak P2 is made larger than the maximum value of the upstream peak P1 (requirement (F)). This point is different from the embodiment 2.

As regards the magnetic flux density Br of the regulating magnetic pole N1 in the normal direction in the embodiment 2', the maximum value of the upstream peak P1 is 42 mT, and the maximum value of the downstream peak P2 is 53 mT. Incidentally, the maximum value of the magnetic flux density Br of the scooping magnetic pole S1 in the embodiment 2' is 59 mT which is the same as that in the embodiment 2.

In the embodiment 2', the effect of the embodiment 1 is added to the effect of the embodiment 2, and therefore, it is expected that the position (where the line of magnetic flux extends in the normal direction) where the magnetic flux density Bθ in the tangential direction is 0 between the two peaks P1 and P2 of the magnetic flux density Br of the regulating magnetic pole N1 in the normal direction is shifted toward a further downstream direction. In actually, the magnetic flux density Bθ in the tangential direction is compared between the embodiment 2 and the embodiment 2' in FIG. 9, it is understood that the position where the magnetic flux density Bθ in the tangential direction is 0 between the two peaks P1 and P2 of the magnetic flux density Br of the regulating magnetic pole N1 in the normal direction, i.e., the position where the line of magnetic flux extends in the normal direction is shifted further in the downstream direction in the case of the embodiment 2'.

In the case of this embodiment described above, by employing the constitution as described above, in the magnetic flux density distribution in which the regulating magnetic pole N1 disposed closest to the regulating member 25 has the two maximum values (peaks), the fluctuation in developer amount regulated by the regulating member 25 can be suppressed.

Third Embodiment

A third embodiment will be described using FIG. 10 while making reference to FIG. 2. In the first embodiment, the requirements (A) to (D) are satisfied. On the other hand, in this embodiment, in addition to the requirements (A) to (C), a requirement (K) described later is satisfied. Other constitutions and actions are similar to those in the above-described first embodiment, and therefore, the similar constitutions are emitted from description and illustration or briefly described by adding the same reference numerals or symbols. In the following, a difference from the first embodiment will be principally described.

In the case of this embodiment, of the above-described requirements (A) to (H), at least the requirements (A) to (C) are satisfied. In addition to these, the following requirement (K) is satisfied. Further, it is preferable that the following requirement (L) and the above-described requirement (F) is satisfied. However, in this embodiment, the above-described requirement (H) is not satisfied.

(K) The absolute value |Br| of the maximum value of the magnetic flux density of the upstream-side magnetic pole (scooping magnetic pole S1) in the normal direction is larger than the absolute value |Br| of the magnetic flux density of the downstream-side magnetic pole (feeding magnetic pole S2) in the normal direction.

(L) A difference between the absolute value |Br| of the maximum value of the magnetic flux density of the upstream-side magnetic pole (scooping magnetic pole S1) in the normal direction and the absolute value |Br| of the magnetic flux density of the downstream-side magnetic pole (feeding magnetic pole S2) in the normal direction is 5 mT or more.

An embodiment 3 and an embodiment 3' for the regulating magnetic pole N1 in this embodiment will be described while being compared with the comparison example 1 (described in the embodiment 1) as shown in FIG. 10. Outlines of image forming apparatuses 1 and developing devices 20 in the embodiment 3 and the embodiment 3' are similar to the outline in the embodiment 1, and therefore will be omitted from detailed description.

In FIG. 10, a magnetic flux density Br (solid line) in the normal direction in the embodiment 3 for the regulating magnetic pole N1 in this embodiment, a magnetic flux density for (dotted line) in the normal direction in the embodiment 3' for the regulating magnetic pole N1 in this embodiment, and the magnetic flux density Br (broken line) in the normal direction in the comparison example 1 are shown. Further, in FIG. 10, magnetic flux densities Bθ in the tangential direction for the embodiment 3, the embodiment 3', and the comparison example 1 are also represented together by a bold solid line, a bold dotted line, and a bold broken line, respectively, in the case where a downstream-side of the rotational direction of the developing sleeve 24 is taken as a positive side of θ axis.

First, the embodiment 3 satisfies the above-described requirements (A), (B), (C) and (K) and may preferably further satisfy the requirement (L). As shown in FIG. 10, the embodiment 3 is different from the comparison example 1 in that the distribution of the magnetic flux density Br, in the normal direction, of each of the scooping magnetic pole S1 disposed upstream of the regulating magnetic pole N1 and the feeding magnetic pole S2 disposed downstream of the regulating magnetic pole N1 is different from the associated distribution in the comparison example 1.

As described in the first embodiment, the position where the line of magnetic flux of the regulating magnetic pole N1 extends in the normal direction is largely influenced also by the relationship between the regulating magnetic pole N1 and the magnetic pole adjacent to the regulating magnetic pole N1. As described hereinabove, it would be considered that the position where the line of magnetic flux of the regulating magnetic pole N1 extends in the normal direction (infinity direction) readily shifts in a direction in which the magnetic pole having a smaller absolute value Br of the magnetic flux density in the normal direction exists when the maximum values of the magnetic flux density Br, in the normal direction, of the magnetic poles disposed upstream and downstream of the regulating magnetic pole N1 are compared with each other.

As regards the magnet roller **24*m* in the comparison example 1, the maximum value (88 mT) of the magnetic flux density Br, in the normal direction, of the feeding magnetic pole S2 positioned downstream of the regulating magnetic pole N1 is larger than the maximum value (44 mT) of the magnetic flux density Br, in the normal direction, of the scooping magnetic pole S1 positioned upstream of the regulating magnetic pole N1. For that reason, the position where the line of magnetic flux of the regulating magnetic pole N1 in the comparison example 1 extends readily shifts in the upstream direction in which the scooping magnetic pole S1** smaller in absolute value Br of the magnetic flux density in the normal direction exists. In actuality, in the comparison example 1, the position O where the magnetic flux density Bθ in the tangential direction is 0 shifts relatively largely toward the upstream side.

On the other hand, as shown in FIG. 10, as regards the magnet roller **24*m* in the embodiment 3, different from the case of the comparison example 1, the maximum value (46 mT) of the magnetic flux density Br, in the normal direction of the feeding magnetic pole S2 positioned downstream of the regulating magnetic pole N1 is smaller than the maximum value (50 mT) of the magnetic flux density Br, in the normal direction, of the scooping magnetic pole S1 positioned upstream of the regulating magnetic pole N1 (requirement (K)). For that reason, the position where the line of magnetic flux of the regulating magnetic pole N1 in the embodiment 3 extends in the normal direction readily shifts in the downstream direction in which the feeding magnetic pole S2** smaller in absolute value Br of the magnetic flux density in the normal direction exists.

In actuality, as shown in FIG. 10, in the embodiment 3, the position O where the magnetic flux density Bθ in the tangential direction is 0 shifts largely toward the downstream side compared with the case of the comparison example 1.

From the above, the maximum value of the magnetic flux density Br, in the normal direction, of the magnetic pole (feeding magnetic pole S2 in this embodiment) disposed downstream of and adjacent to the regulating magnetic pole N1 is made smaller than the maximum value of the magnetic flux density Br, in the normal direction, of the magnetic pole (scooping magnetic pole S1 in this embodiment) disposed upstream of and adjacent to the regulating magnetic pole N1, so that the region in which the developer amount change is small and in which the magnetic flux density Bθ in the tangential direction is negative can be increased, and by disposing the regulating member 25 in this region, the pole position latitude can be extended.

When the maximum value of the magnetic flux density Br, in the normal direction, of the magnetic pole (feeding magnetic pole S2 in this embodiment) disposed downstream of and adjacent to the regulating magnetic pole N1 is made smaller than the maximum value of the magnetic flux density Br, in the normal direction, of the regulating magnetic pole N1, a somewhat effect can be obtained, but in order to obtain a sufficient effect, the former maximum value may preferably be made smaller by 5 mT or more (requirement (L)), more preferably be made smaller by 10 mT or more for obtaining a further effect.

Next, the embodiment 3' satisfies the requirement (F) in addition to the above-described requirements (A), (B), (C) and (K). Incidentally, in addition thereto, the embodiment 3' may preferably further satisfy the requirement (L). Incidentally, in FIG. 10, the magnet roller **24*m* in the embodiment 3' is shown. In the embodiment 3', similarly as in the embodiment 3, the maximum value of the magnetic flux density Br, in the normal direction, of the magnetic pole (feeding magnetic pole S2 in this embodiment) disposed downstream of and adjacent to the regulating magnetic pole N1** is made smaller than the maximum value of the magnetic flux density Br, in the normal direction, of the magnetic pole (scooping magnetic pole S1 in this embodiment) disposed upstream of and adjacent to the regulating magnetic pole N1 (requirement (K)). At the same time, as the embodiment 1, for the absolute value |Br| of the magnetic flux density of the regulating magnetic pole N1 in the normal direction, the downstream peak P2 is made larger than the upstream peak P1 (requirement (F)).

As regards the magnetic flux density Br of the regulating magnetic pole N1 in the normal direction in the embodiment 3', the maximum value of the upstream peak P1 is 42 mT, and the maximum value of the downstream peak P2 is 53 mT.

In the case of this embodiment described above, by employing the constitution as described above, in the magnetic flux density distribution in which the regulating magnetic pole N1 disposed closest to the regulating member 25 has the two maximum values (peaks), the fluctuation in developer amount regulated by the regulating member 25 can be suppressed.

Other Embodiments

In the above-described embodiments, the case where the present invention is applied to the developing device for use in the image forming apparatus of the tandem type was described. However, the present invention is also applicable to the developing device for use in the image forming apparatus of another type. Further, the image forming apparatus is not limited to the image forming apparatus for a full-color image, but may also be an image forming apparatus for a monochromatic image or an image forming apparatus for a mono-color (single color) image. Or, the image forming apparatus can be carried out in various uses, such as printers, various printing machines, copying machines, facsimile machines and multi-function machines by adding necessary devices, equipment and casing structures or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A developing device comprising:

a developing container configured to contain a developer containing toner and a carrier;

a rotatable developing member configured to carry and feed the developer to a developing position;

a magnet provided non rotatably and stationarily inside said rotatable developing member and provided with a regulating magnetic pole; and a regulating portion configured to regulate an amount of the developer carried on said rotatable developing member by a magnetic force of the regulating magnetic pole, wherein with respect to a rotational direction of said rotatable developing member, a local minimum position where a magnetic flux density of the regulating magnetic pole in a normal direction relative to an outer peripheral surface of said rotatable developing member is a local minimum value is downstream of a first local maximum position where the magnetic flux density of the regulating magnetic pole in the normal direction relative to the outer peripheral surface of said rotatable developing member is a first local maximum value, and is upstream of a second local maximum position where the magnetic flux density of the regulating magnetic pole in the normal direction relative to the outer peripheral surface of said rotatable developing member is a second local maximum value, wherein with respect to the rotational direction of said rotatable developing member, an angle between the first local maximum position and the second local maximum position is 20° or more and less than 50°, wherein with respect to the rotational direction of said rotatable developing member, a position where the magnetic flux density of the regulating magnetic pole in a tangential direction relative to the outer peripheral surface of said rotatable developing member is zero is between the first local maximum position and the second local maximum position, wherein with respect to the rotational direction of said rotatable developing member, an opposing position where said regulating portion is opposed to the outer peripheral surface of said rotatable developing member is between the first local maximum position and the position where the magnetic flux density of the regulating magnetic pole in the tangential direction relative to the outer peripheral surface of said rotatable developing member is zero, and wherein with respect to the rotational direction of said rotatable developing member, the position where the magnetic flux density of the regulating magnetic pole in the tangential direction relative to the outer peripheral surface of said rotatable developing member is zero is within a range of ±2° of a midpoint between the first local maximum position and the second local maximum position or is downstream of the range.

2. A developing device according to claim 1, wherein with respect to the rotational direction of said rotatable developing member, the position where the magnetic flux density of the regulating magnetic pole in the tangential direction relative to the outer peripheral surface of said rotatable developing member is zero is downstream of the midpoint between the first local maximum position and the second local maximum position.

3. A developing device according to claim 1, wherein with respect to the rotational direction of said rotatable developing member, an angle from the first local maximum position to the position where the magnetic flux density of the regulating magnetic pole in the tangential direction relative to the outer peripheral surface of said rotatable developing member is zero is 15° or more and less than 50°.

4. A developing device according to claim 1, wherein a difference between an absolute value of the first local maximum value and an absolute value of the magnetic flux density of the regulating magnetic pole in the normal direction relative to the outer peripheral surface of said rotatable developing member in the position where the magnetic flux density of the regulating magnetic pole in the tangential direction relative to the outer peripheral surface of said rotatable developing member is zero is 10 mT or less.

5. A developing device according to claim 1, wherein an absolute value of the first local maximum value is smaller than an absolute value of the second local maximum value.

6. A developing device according to claim 1, wherein said magnet further includes an upstream side magnetic pole provided adjacent to the regulating magnetic pole on a side upstream of the regulating magnetic pole with respect to the rotational direction of said rotatable developing member and a downstream side magnetic pole provided adjacent to the regulating magnetic pole on a side downstream of the regulating magnetic pole with respect to the rotational direction of said rotatable developing member, and wherein with respect to the rotational direction of said rotatable developing member, an absolute value of a local maximum value of a magnetic flux density of the upstream side magnetic pole in the normal direction relative to the outer peripheral surface of said rotatable developing member is smaller than an absolute value of a local maximum value of a magnetic flux density of the downstream side magnetic pole in the normal direction relative to the outer peripheral surface of said rotatable developing member.

7. A developing device comprising:

a developing container configured to contain a developer containing toner and a carrier;

a rotatable developing member configured to carry and feed the developer to a developing position;

a magnet provided non rotatably and stationarily inside said rotatable developing member and provided with a regulating magnetic pole, an upstream side magnetic pole adjacent to the regulating magnetic pole on a side upstream of the regulating magnetic pole with respect to a rotational direction of said rotatable developing member, and a downstream side magnetic pole provided adjacent to the regulating magnetic pole on a side downstream of the regulating magnetic pole with respect to the rotational direction of said rotatable developing member; and a regulating portion configured to regulate an amount of the developer carried on said rotatable developing member by a magnetic force of the regulating magnetic pole, wherein with respect to the rotational direction of said rotatable developing member, a local minimum position where a magnetic flux density of the regulating magnetic pole in a normal direction relative to an outer peripheral surface of said rotatable developing member is a local minimum value is downstream of a first local maximum position where the magnetic flux density of the regulating magnetic pole in the normal direction relative to the outer peripheral surface of said rotatable developing member is a first local maximum value, and is upstream of a second local maximum position where the magnetic flux density of the regulating magnetic pole in the normal direction relative to the outer peripheral surface of said rotatable developing member is a second local maximum value, wherein with respect to the rotational direction of said rotatable developing member, an angle between the first local maximum position and the second local maximum position is 20° or more and less than 50° , wherein with respect to the rotational direction of said rotatable developing member, a position where the magnetic flux density of the regulating magnetic pole in a tangential direction relative to the outer peripheral surface of said rotatable developing member is zero is between the first local maximum position and the second local maximum position, wherein with respect to the rotational direction of said rotatable developing member, an opposing position where said regulating portion is opposed to the outer peripheral surface of said rotatable developing member is between the first local maximum position and the position where the magnetic flux density of the regulating magnetic pole in the tangential direction relative to the outer peripheral surface of said rotatable developing member is zero, wherein with respect to the rotational direction of said rotatable developing member, an absolute value of a local maximum value of a magnetic flux density of the upstream side magnetic pole in the normal direction relative to the outer peripheral surface of said rotatable developing member is smaller than an absolute value of a local maximum value of a magnetic flux density of the downstream side magnetic pole in the normal direction relative to the outer peripheral surface of said rotatable developing member, and wherein an absolute value of the first local maximum value is smaller than an absolute value of the second local maximum value.

8. A developing device comprising:

a developing container configured to contain a developer containing toner and a carrier;

a rotatable developing member configured to carry and feed the developer to a developing position;

a magnet provided non rotatably and stationarily inside said rotatable developing member and provided with a regulating magnetic pole and an upstream side magnetic pole provided adjacent to the regulating magnetic pole on a side upstream of the regulating magnetic pole with respect to a rotational direction of said rotatable developing member; and a regulating portion configured to regulate an amount of the developer carried on said rotatable developing member by a magnetic force of the regulating magnetic pole, wherein with respect to the rotational direction of said rotatable developing member, a local minimum position where a magnetic flux density of the regulating magnetic pole in a normal direction relative to an outer peripheral surface of said rotatable developing member is a local minimum value is downstream of a first local maximum position where the magnetic flux density of the regulating magnetic pole in the normal direction relative to the outer peripheral surface of said rotatable developing member is a first local maximum value, and is upstream of a second local maximum position where the magnetic flux density of the regulating magnetic pole in the normal direction relative to the outer peripheral surface of said rotatable developing member is a second local maximum value, wherein with respect to the rotational direction of said rotatable developing member, an angle between the first local maximum position and the second local maximum position is 20° or more and less than 50° , wherein with respect to the rotational direction of said rotatable developing member, a position where the magnetic flux density of the regulating magnetic pole in a tangential direction relative to the outer peripheral surface of said rotatable developing member is zero is between the first local maximum position and the second local maximum position, wherein with respect to the rotational direction of said rotatable developing member, an opposing position where said regulating portion is opposed to the outer peripheral surface of said rotatable developing member is between the first local maximum position and the position where the magnetic flux density of the regulating magnetic pole in the tangential direction relative to the outer peripheral surface of said rotatable developing member is zero, and wherein an absolute value of a local maximum value of a magnetic flux density of the upstream side magnetic pole in the normal direction relative to the outer peripheral surface of said rotatable developing member is larger than an absolute value of the first local maximum value.

9. A developing device according to claim 8, wherein a difference between the absolute value of the magnetic flux density of the upstream side magnetic pole in the normal direction relative to the outer peripheral surface of said rotatable developing member and the absolute value of the first local maximum value is 5 mT or more.

10. A developing device according to claim 8, wherein the absolute value of the first local maximum value is smaller than an absolute value of the second local maximum value.

11. A developing device according to claim 10, wherein said magnet for further includes a downstream side magnetic pole provided adjacent to the regulating magnetic pole on a side downstream of the regulating magnetic pole with respect to the rotational direction of said rotatable developing member, and wherein the absolute value of the local maximum value of the magnetic flux density of the upstream side magnetic pole in the normal direction relative to the outer peripheral surface of said rotatable developing member is smaller than an absolute value of a local maximum value of a magnetic flux density of the downstream side magnetic pole in the normal direction relative to the outer peripheral surface of said rotatable developing member.

12. A developing device comprising:

a developing container configured to contain a developer containing toner and a carrier;

a rotatable developing member configured to carry and feed the developer to a developing position;

a magnet provided non rotatably and stationarily inside the rotatable developing member and provided with a regulating magnetic pole, an upstream side magnetic pole adjacent to the regulating magnetic pole on a side upstream of the regulating magnetic pole with respect to a rotational direction of said rotatable developing member, and a downstream side magnetic pole provided adjacent to the regulating magnetic pole on a side downstream of the regulating magnetic pole with respect to the rotational direction of said rotatable developing member; and a regulating portion configured to regulate an amount of the developer carried on said rotatable developing member by a magnetic force of the regulating magnetic pole, wherein with respect to the rotational direction of said rotatable developing member, a local minimum position where a magnetic flux density of the regulating magnetic pole in a normal direction relative to an outer peripheral surface of said rotatable developing member is a local minimum value is downstream of a first local maximum position where the magnetic flux density of the regulating magnetic pole in the normal direction relative to the outer peripheral surface of said rotatable developing member is a first local maximum value, and is upstream of a second local maximum position where the magnetic flux density of the regulating magnetic pole in the normal direction relative to the outer peripheral surface of said rotatable developing member is a second local maximum value, wherein with respect to the rotational direction of said rotatable developing member, an angle between the first local maximum position and the second local maximum position is 20° or more and less than 50° , wherein with respect to the rotational direction of said rotatable developing member, a position where the magnetic flux density of the regulating magnetic pole in a tangential direction relative to the outer peripheral surface of said rotatable developing member is zero is between the first local maximum position and the second local maximum position, wherein with respect to the rotational direction of said rotatable developing member, an opposing position where said regulating portion is opposed to the outer peripheral surface of said rotatable developing member is between the first local maximum position and the position where the magnetic flux density of the regulating magnetic pole in the tangential direction relative to the outer peripheral surface of said rotatable developing member is zero, and wherein with respect to the rotational direction of said rotatable developing member, an absolute value of a local maximum value of a magnetic flux density of the upstream side magnetic pole in the normal direction relative to the outer peripheral surface of said rotatable developing member is larger than an absolute value of a local maximum value of a magnetic flux density of the downstream side magnetic pole in the normal direction relative to the outer peripheral surface of said rotatable developing member.

13. A developing device according to claim 12, wherein a difference between an absolute value of the magnetic flux density of the upstream side magnetic pole in the normal direction relative to the outer peripheral surface of said rotatable developing member and an absolute value of the magnetic flux density of the downstream side magnetic pole in the normal direction relative to the outer peripheral surface of said rotatable developing member is 5 mT or more.

14. A developing device according to claim 12, wherein an absolute value of the first local maximum value is smaller than an absolute value of the second local maximum value.

* * * * *